(12) United States Patent
Whitney

(10) Patent No.: US 10,107,440 B2
(45) Date of Patent: Oct. 23, 2018

(54) DEVICES AND ASSEMBLY FOR PROTECTING A FLANGE

(71) Applicant: Craig Whitney, Calgary (CA)

(72) Inventor: Craig Whitney, Calgary (CA)

(*) Notice: Subject to any disclaimer, the term of this patent is extended or adjusted under 35 U.S.C. 154(b) by 238 days.

(21) Appl. No.: 14/926,990

(22) Filed: Oct. 29, 2015

(65) Prior Publication Data

US 2016/0230916 A1   Aug. 11, 2016

Related U.S. Application Data

(60) Provisional application No. 62/113,095, filed on Feb. 6, 2015.

(51) Int. Cl.

| | |
|---|---|
| *F16L 55/10* | (2006.01) |
| *F16L 57/00* | (2006.01) |
| *F16B 2/20* | (2006.01) |
| *F16L 23/00* | (2006.01) |
| *B65D 59/02* | (2006.01) |
| *B65D 59/06* | (2006.01) |

(52) U.S. Cl.
CPC ............ *F16L 57/005* (2013.01); *B65D 59/02* (2013.01); *B65D 59/06* (2013.01); *F16B 2/20* (2013.01); *F16L 23/003* (2013.01)

(58) Field of Classification Search
CPC .................................................... F16L 57/005
USPC ....................................... 138/89, 96 R, 96 T
See application file for complete search history.

(56) References Cited

U.S. PATENT DOCUMENTS

| | | | | |
|---|---|---|---|---|
| 535,390 | A * | 3/1895 | Murphy | .................... E06B 9/02 |
| | | | | 114/174 |
| 1,642,330 | A * | 9/1927 | Brownstein | ............ B65D 59/06 |
| | | | | 138/96 T |
| 2,092,535 | A * | 9/1937 | Schnorr | ................. B65D 59/02 |
| | | | | 138/96 T |
| 3,525,366 | A * | 8/1970 | De Frees | ............ F16L 55/1152 |
| | | | | 138/109 |
| 4,177,931 | A * | 12/1979 | Evans | ................ B60K 15/0406 |
| | | | | 220/266 |
| 4,348,875 | A * | 9/1982 | Tsuru | ........................ F16C 3/02 |
| | | | | 138/89 |
| 4,678,097 | A * | 7/1987 | Crute | ................. B60K 15/0406 |
| | | | | 138/89 |
| 5,244,015 | A * | 9/1993 | Dreyfuss | ................ B65D 59/06 |
| | | | | 138/89 |
| 5,431,815 | A * | 7/1995 | Te-Shin | ................... E03C 1/122 |
| | | | | 137/625.32 |

(Continued)

*Primary Examiner* — James Hook
(74) *Attorney, Agent, or Firm* — Norton Rose Fulbright Canada LLP; Christopher N. Hunter

(57) ABSTRACT

An assembly including a cover device and a cap device for protecting a flange is provided. The cap device may include a cap cover for protecting at least a portion of a front surface of the flange and a retainer comprising at least two cap securing members releasably engageable with an inner surface of the flange in an interference fit, where the retainer is operable to releasably engage the cap cover in a friction-fit. The cover device may include a cover face for protecting the front surface of the flange, the cover face comprising an outer periphery; and an integrally-formed lip depending from the outer periphery of the cover face and perpendicular to the cover face, the lip comprising at least two cover securing members and releasably engagable with a peripheral edge of the flange.

7 Claims, 33 Drawing Sheets

(56) References Cited

U.S. PATENT DOCUMENTS

| | | | | |
|---|---|---|---|---|
| 2002/0079009 A1* | 6/2002 | Presby | ............... | F16L 55/1157 |
| | | | | 138/90 |
| 2007/0113910 A1* | 5/2007 | Pagura | ................. | F16L 57/005 |
| | | | | 138/96 T |
| 2012/0261024 A1* | 10/2012 | Ketzer | ................. | F16L 23/003 |
| | | | | 138/96 R |
| 2013/0153079 A1* | 6/2013 | Zeyfang | ............... | F16L 57/005 |
| | | | | 138/96 R |
| 2015/0129073 A1* | 5/2015 | Quagliani | ................. | F17D 5/02 |
| | | | | 138/89 |

\* cited by examiner

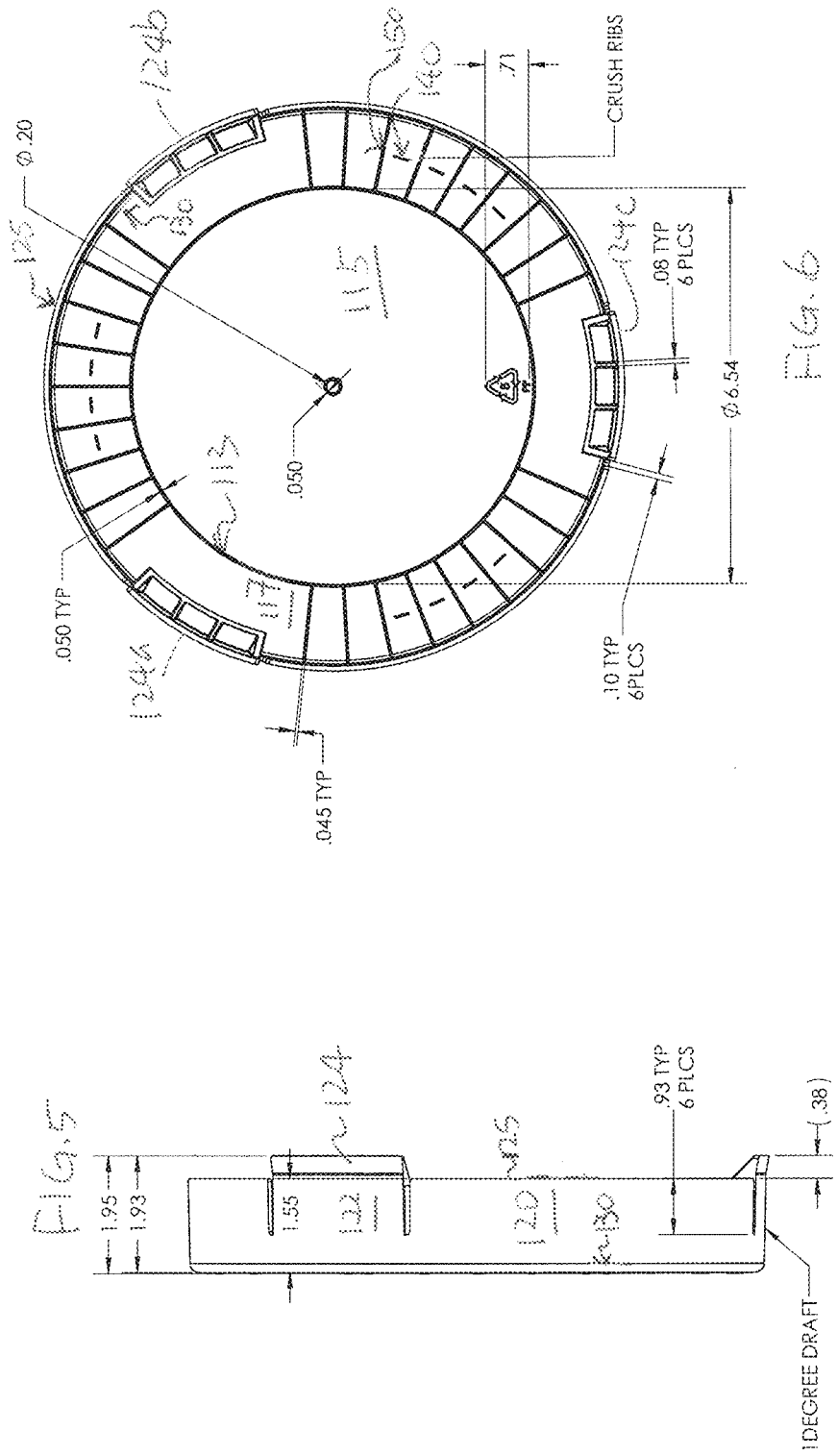

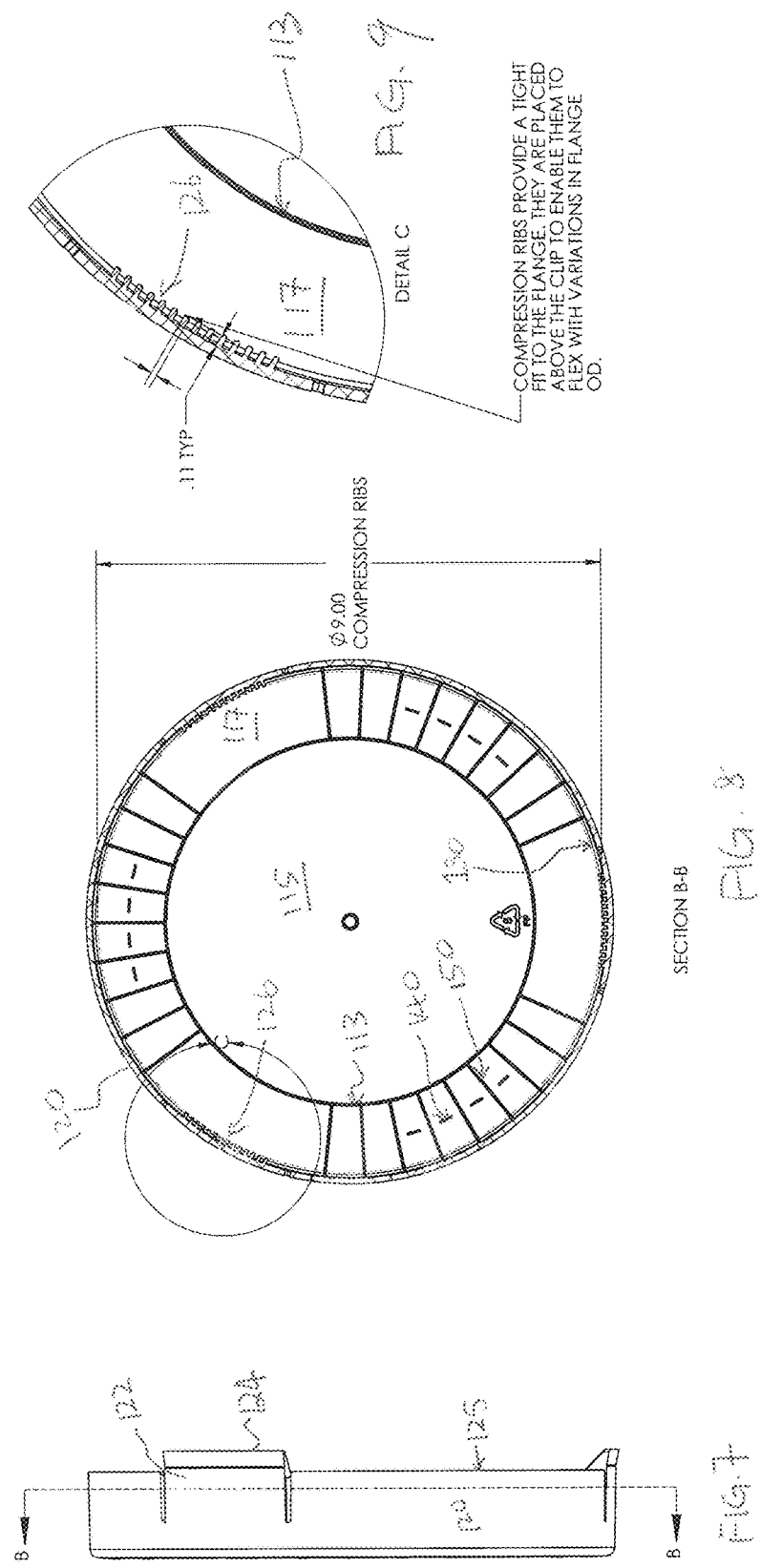

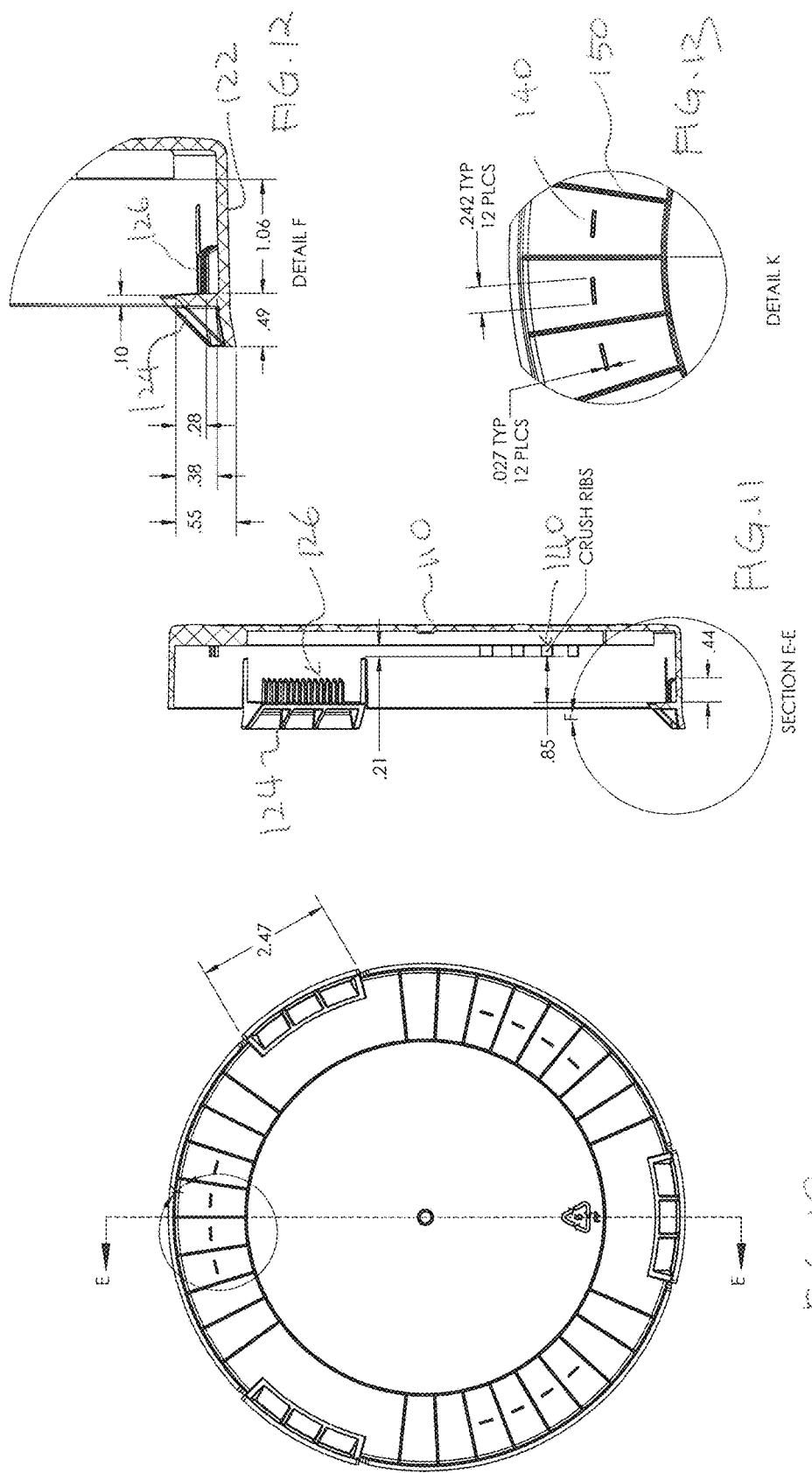

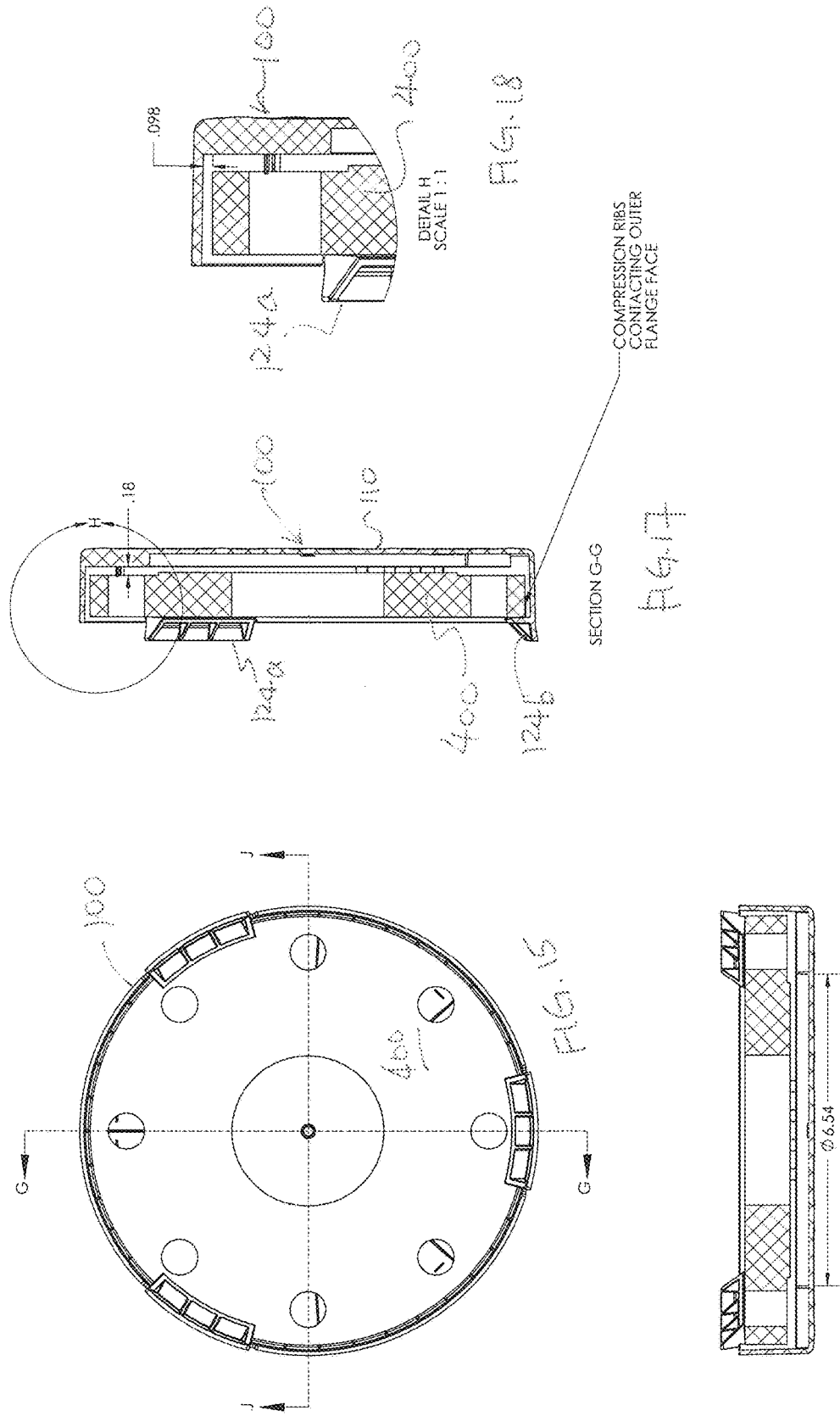

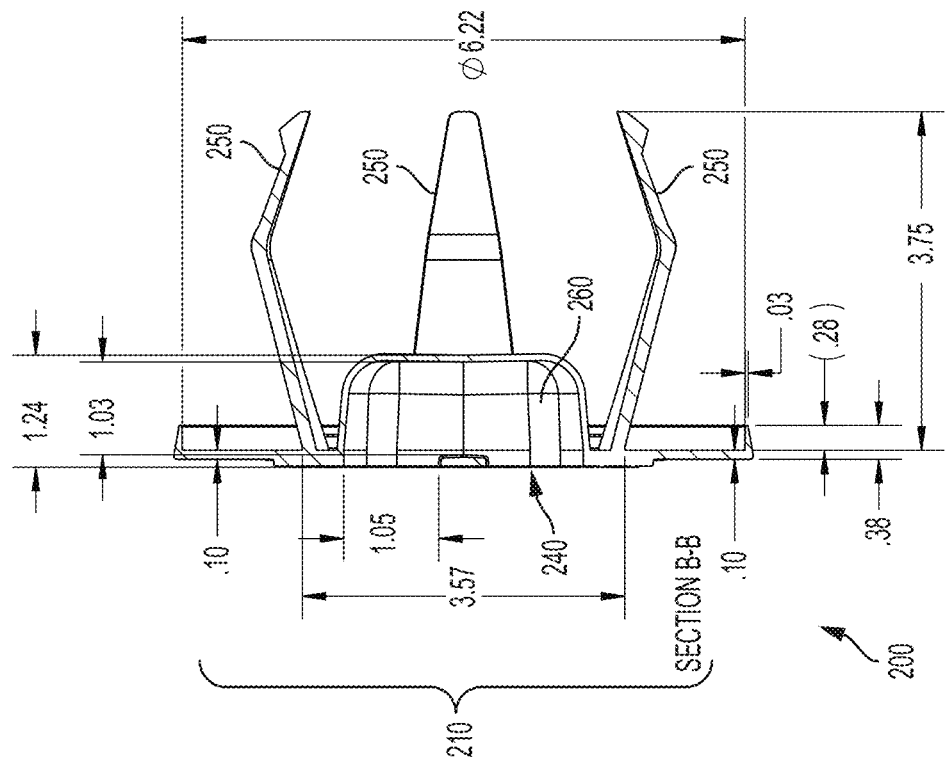
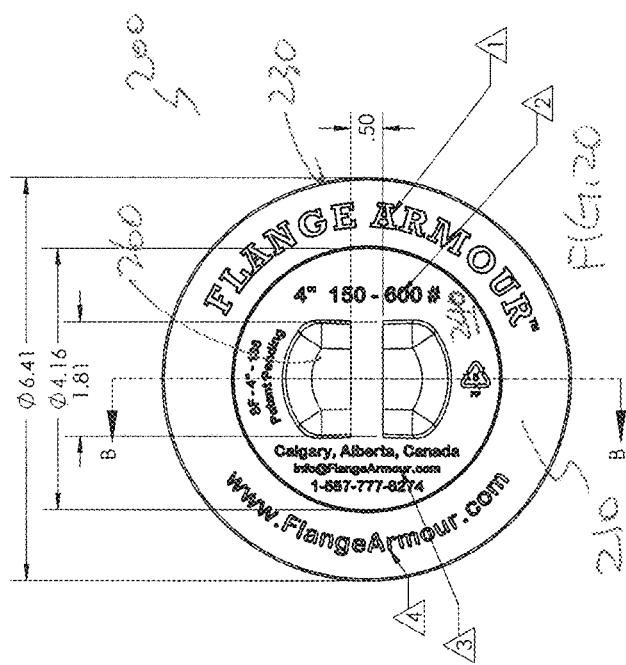
FIG. 21

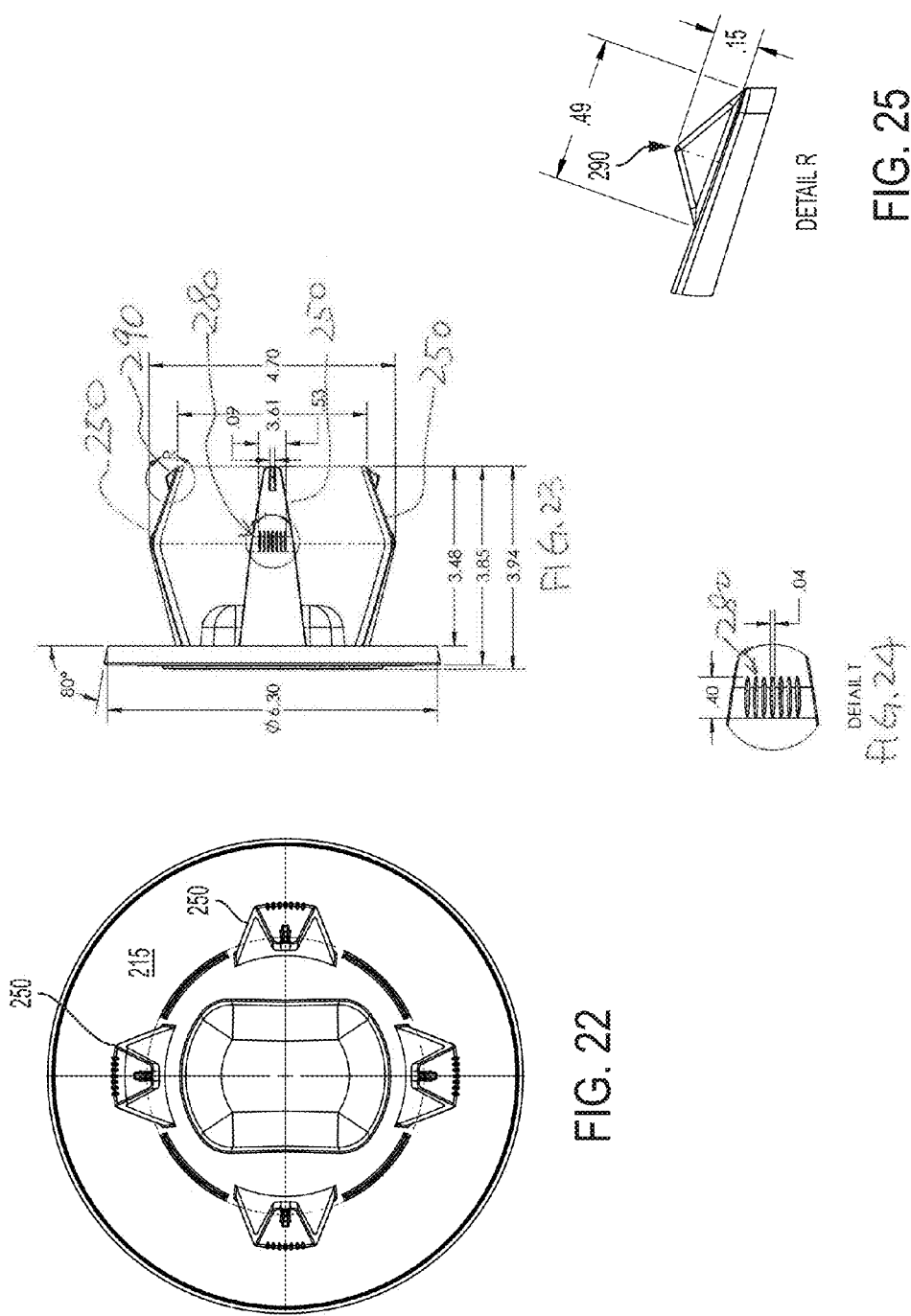

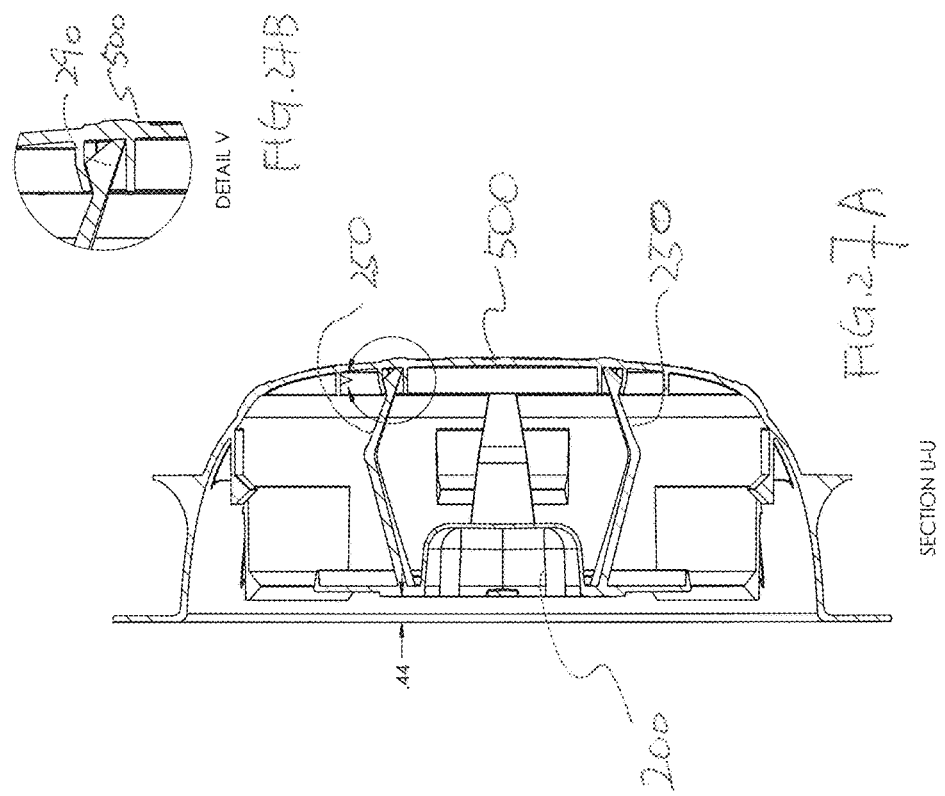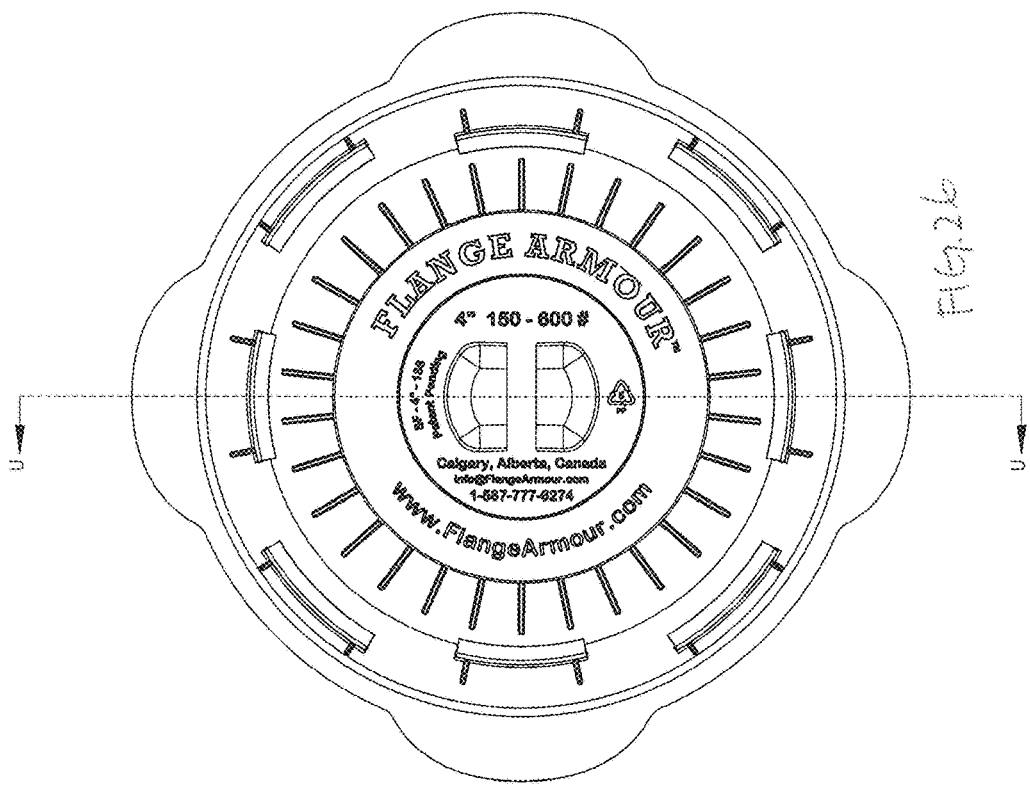

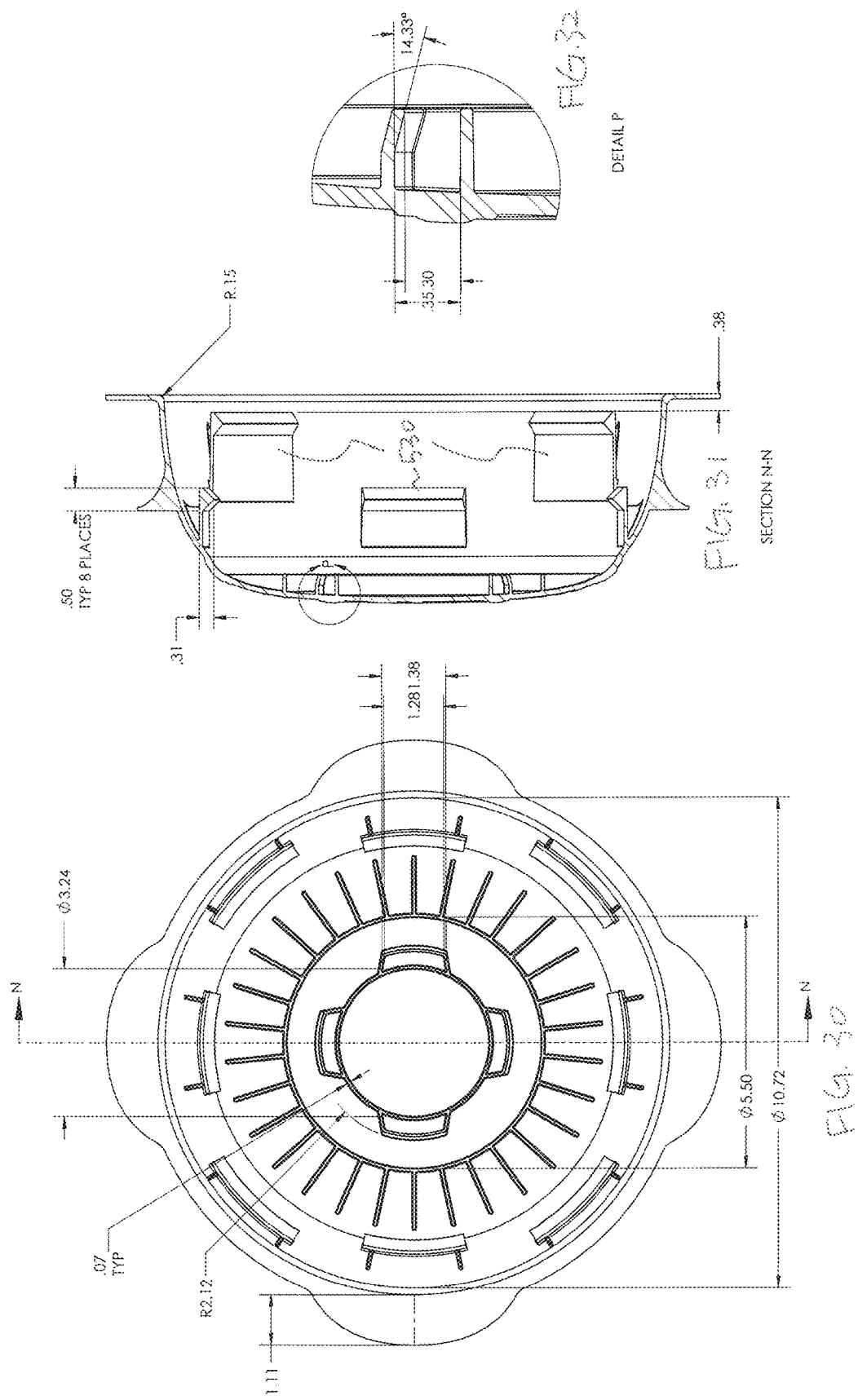

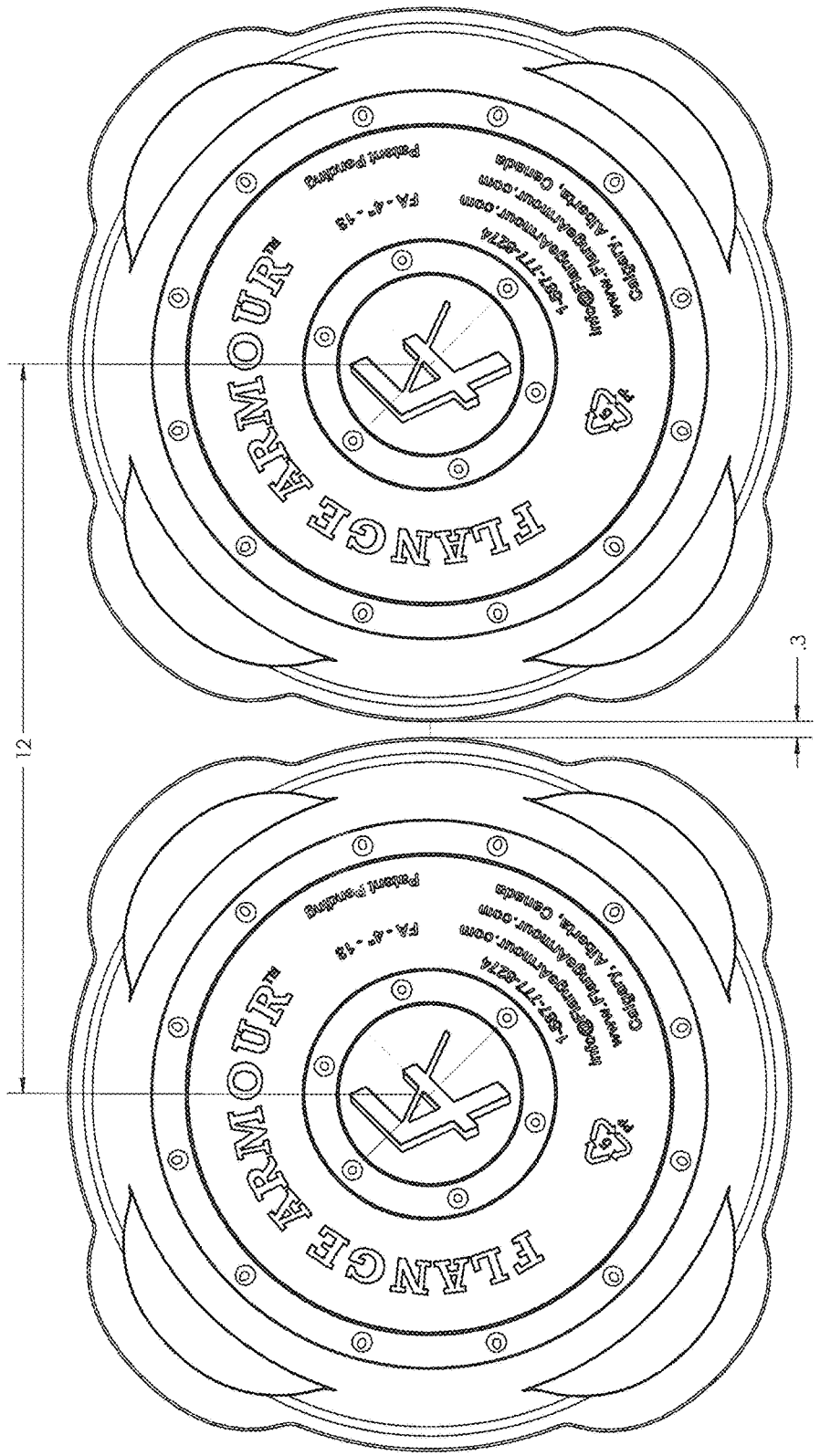

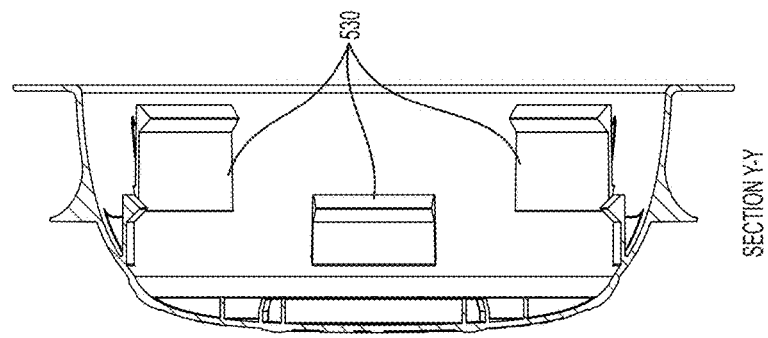
FIG. 37 SECTION Y-Y
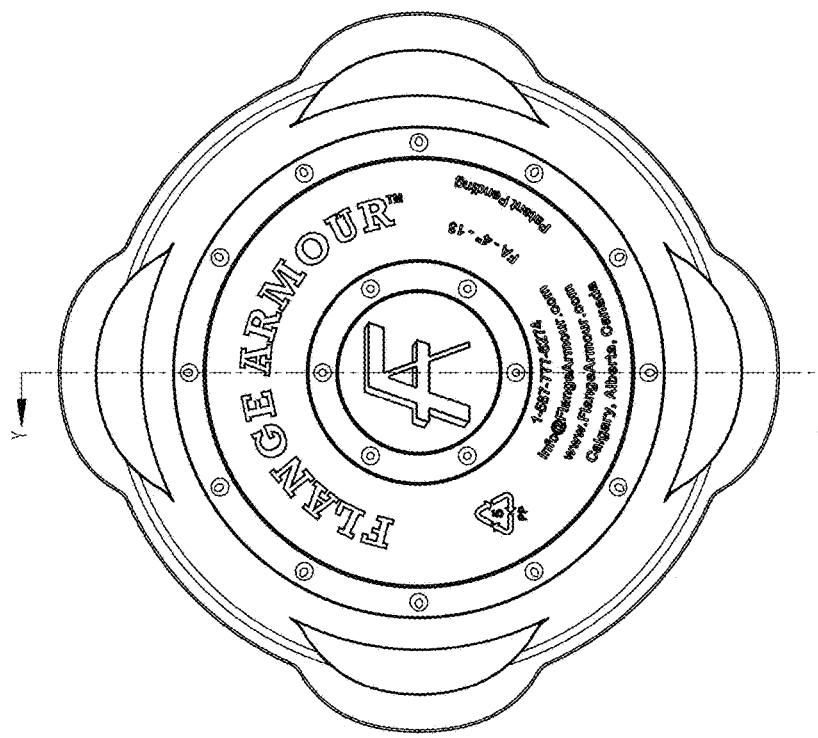
FIG. 36

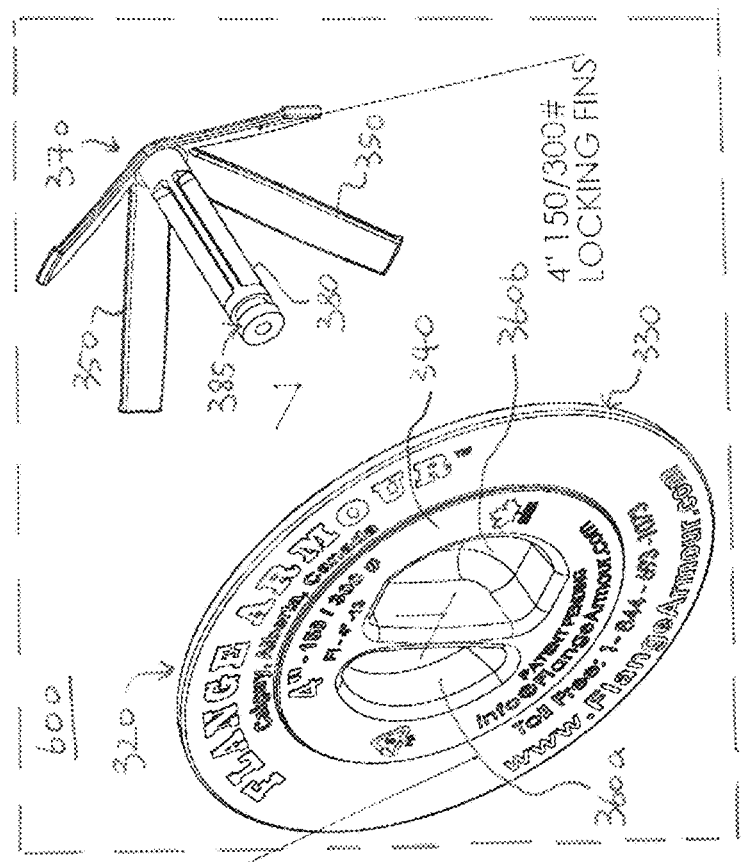
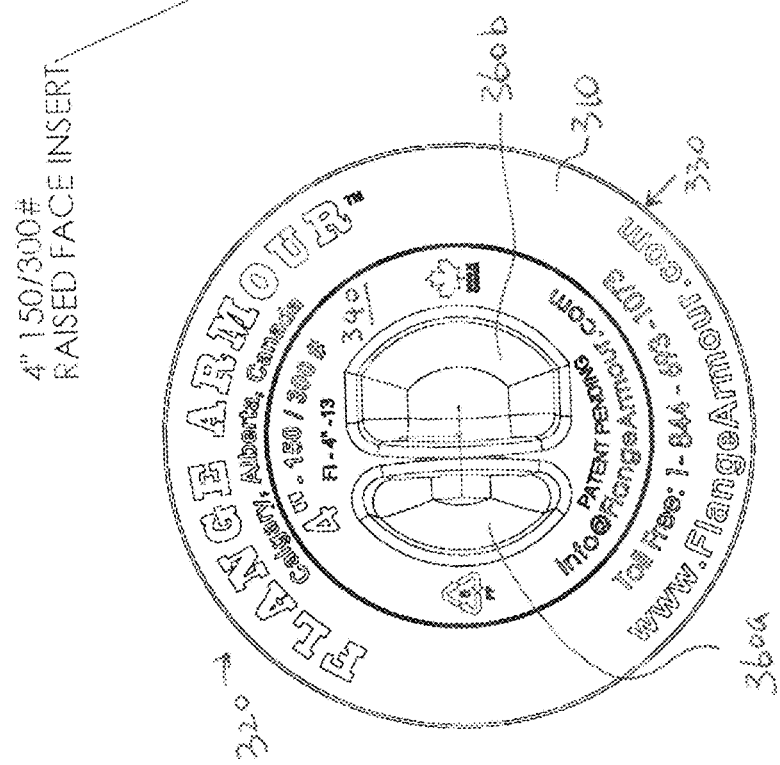

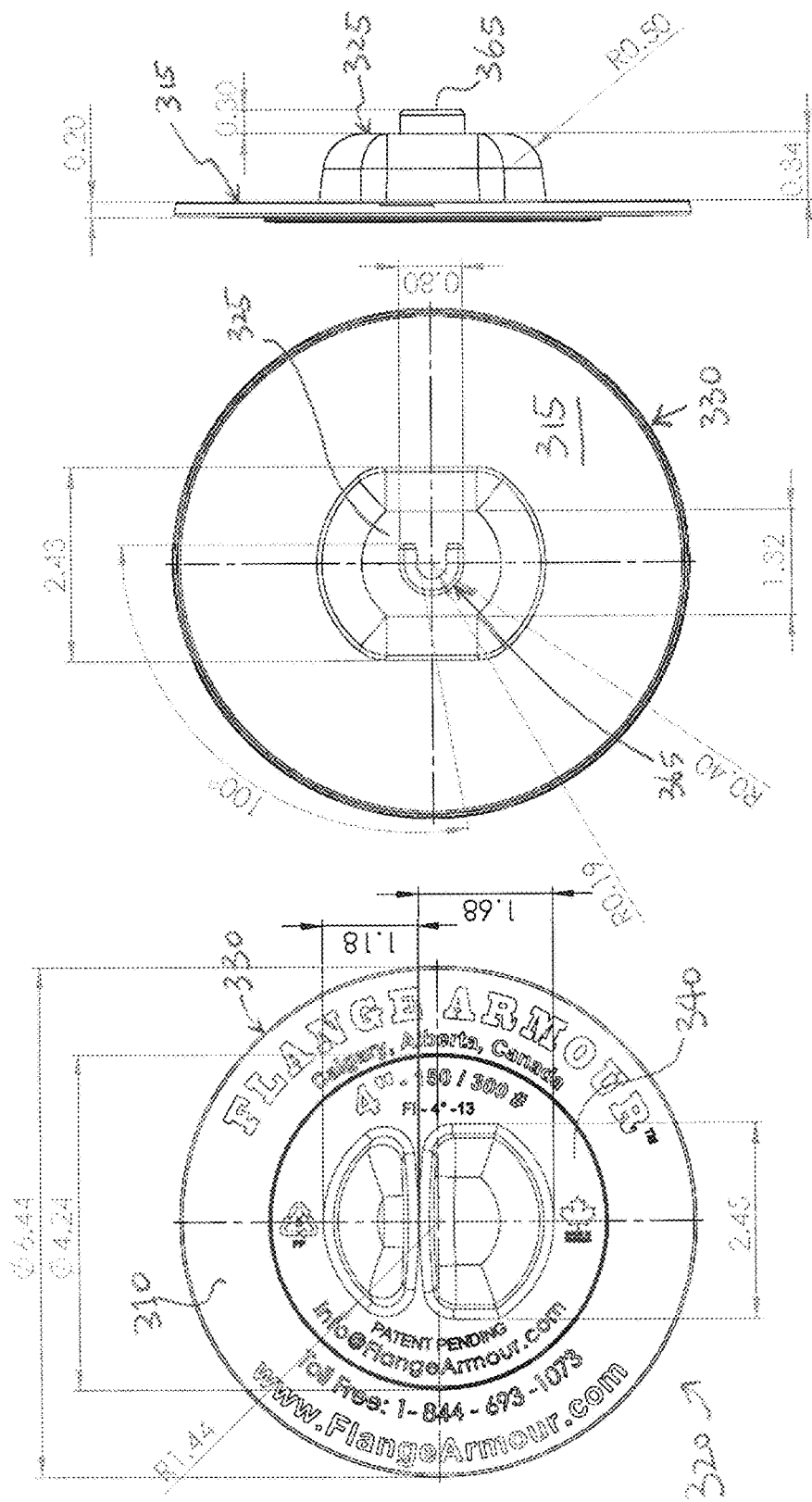

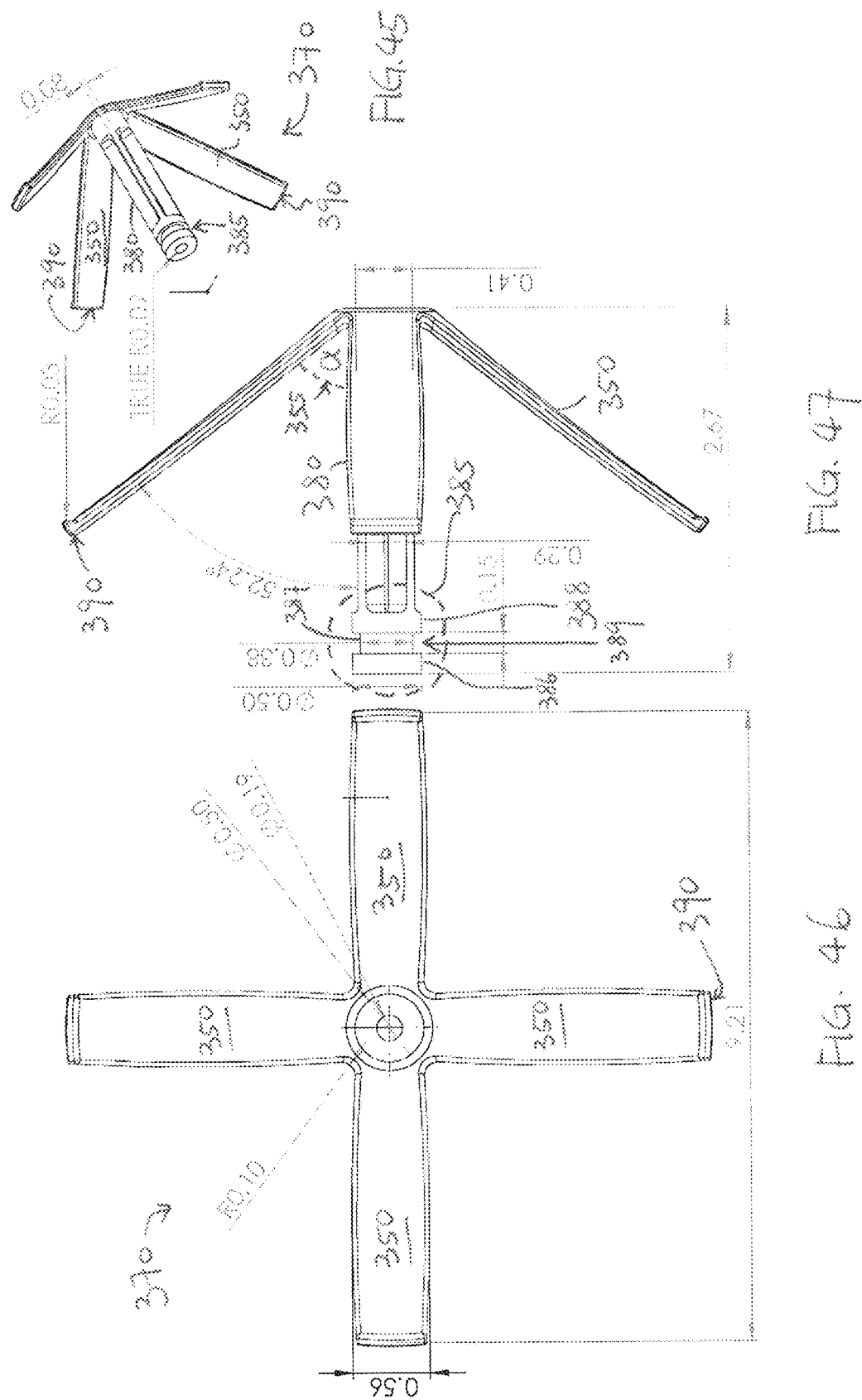

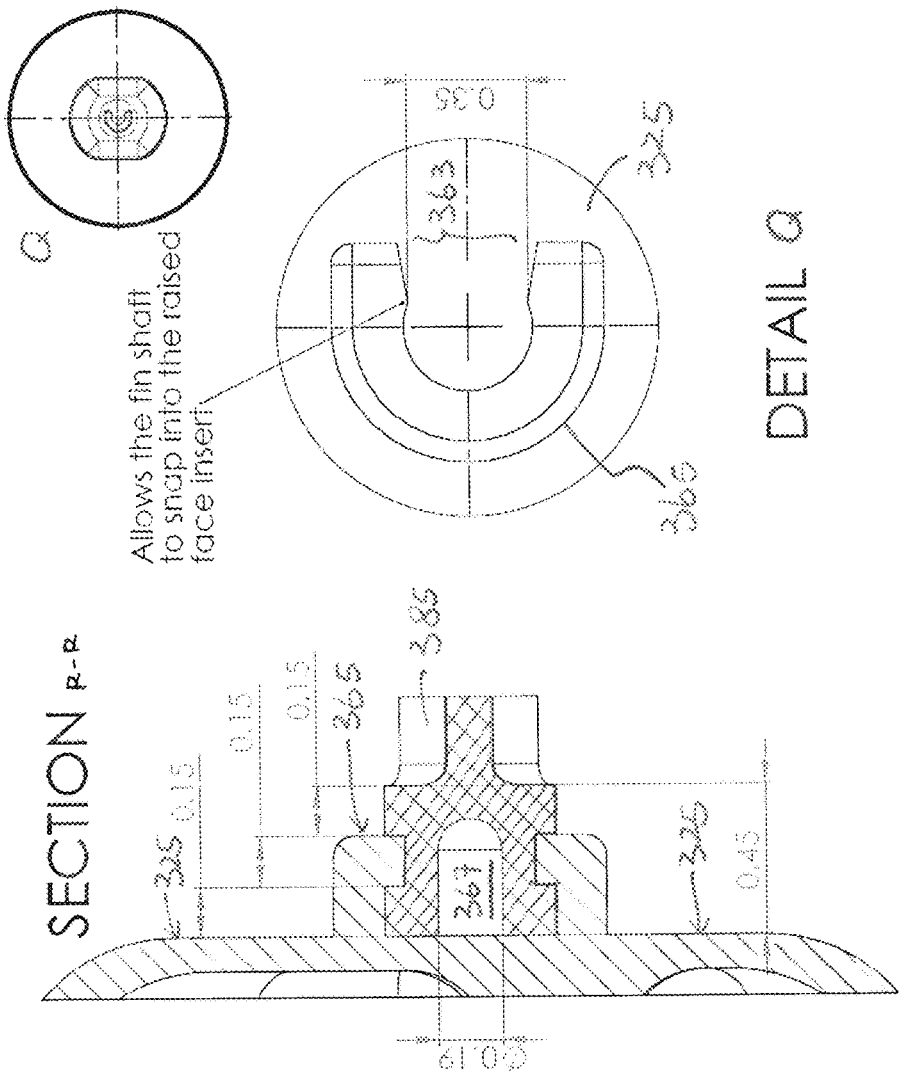
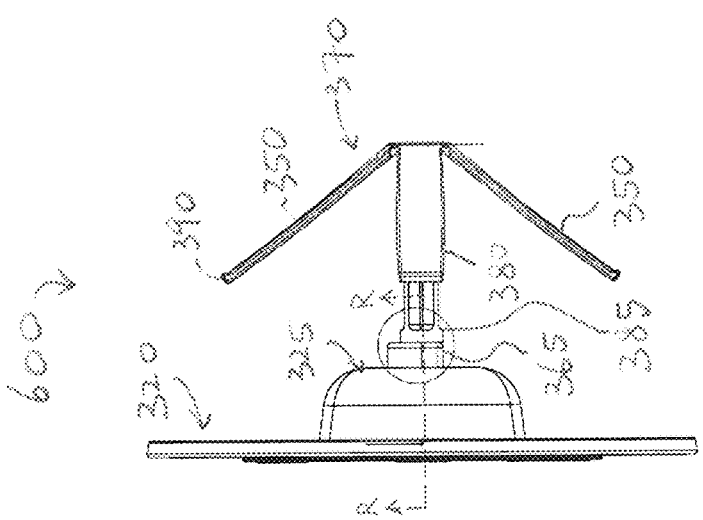

DEVICES AND ASSEMBLY FOR PROTECTING A FLANGE

FIELD

The embodiments described herein generally relate to the field of flange production, assembly, and transportation, including preservation at sites. More particularly, the embodiments relate to the field of protection means for various flanges.

BACKGROUND

Flanges are common in a number of industries such as, but not limited to, the pipe industry or the oil and gas industry. Some flanges may have a flat face where both the gasket surface and the bolting circle surface are on the same plane. Some flanges may have a raised face (RF) for receiving gaskets. A flange may have an inside diameter (ID) that is specific to a size (e.g. sizes according to ASME B16.5 or ASME B16.47 standard). A flange may be further classified based on pressure according to a given industry standard (e.g. ANSI/ASME pressure classes).

Flanges may experience various kinds of damage during the process of fabrication, production, assembly, or transportation to a final destination. In particular, flanges with a raised surface or protruding members on one or both sides may be especially vulnerable to scratches, chips, pits, dents, gauges or other kinds of damage. It is often desirable to shield flanges from harm during various stages such as assembly, transportation, fabrication and so on. Protection of flanges and flange faces can be important to ensure proper downstream manufacturing such as bolting, sealing (e.g. with a gasket), piping, fabrication, and so on.

There thus exists a need for improved flange protection means to help reduce or eliminate damage to flanges, for example during the process of fabrication, production, assembly, or transportation to final destination.

SUMMARY

In accordance with one aspect of the invention, an assembly for protecting an annular flange, the assembly may include: a cap device for insertion into the flange, comprising: a cap cover for protecting at least a portion of a front surface of the flange, the cap cover comprising a handle, wherein the cap cover is at least partially transparent for identifying features of the flange obstructed by the cap cover; and a retainer comprising at least two cap securing members releasably engageable with an inner surface of the flange in an interference fit, wherein the retainer is operable to releasably engage the cap cover in a friction-fit.

The assembly may further include a cover device for covering both the cap and the flange, the cover device may include: a cover face for protecting the front surface of the flange, the cover face comprising an outer periphery; and an integrally-formed lip depending from the outer periphery of the cover face and perpendicular to the cover face, the lip comprising at least two cover securing members and releasably engagable with a peripheral edge of the flange.

In accordance with one aspect, there is provided a cover device for protecting an annular flange, the cover device may include a cover face for protecting a front surface of the flange, the cover face comprising an outer periphery; and an integrally-formed lip depending from the outer periphery of the cover face and perpendicular to the cover face, the lip comprising at least two securing members that are releasably engagable with a peripheral edge of the flange.

In accordance with one aspect, the lip is a circumferential lip.

In accordance with another aspect, a securing member may be a brace arm.

In accordance with another aspect, the at least two securing members may be integrally formed with the circumferential lip.

In accordance with another aspect, one of the at least two securing members may include a cantilever clip.

In accordance with yet another aspect, one of the at least two securing members may be adapted to engage the peripheral edge of the flange in a friction fit.

In accordance with one aspect, one of the at least two securing members may include a plurality of compression ribs.

In accordance with another aspect, the cover face may further include a plurality of groups of crush ribs proximal to the outer periphery of the cover face.

In accordance with another aspect, the cover face may be at least partially transparent for identifying features of the flange obstructed by the cover face.

In accordance with yet another aspect, the cover device may be made from polypropylene.

In accordance with one aspect, there is provided a cap for insertion into a flange, the cap may include a cap face for protecting at least a portion of a front surface of the flange, the cap face comprising a handle; and at least two securing members releasably engagable with an inner surface of the flange in an interference fit.

In accordance with another aspect, the cap face may include a recess, and the handle may extend from a first side of the recess to a second side of the recess.

In accordance with yet another aspect, the at least two securing members may be resistantly biased such that the at least two securing members grip the inner surface of the flange when engaged with the flange.

In accordance with yet another aspect, the cap face may include a raised face and wherein the recess is centrally located on the raised face.

In accordance with one aspect, the cap face may be semi- or fully transparent. For example, it may be at least partially transparent for identifying features of the flange obstructed by the cap face.

In accordance with another aspect, each of the securing members may further include a plurality of contact ribs for griping the inner surface of the flange when engaged with the flange.

In accordance with one aspect, there is provided an assembly for protecting an annular flange, the assembly may include: 1) a cap for insertion into the flange, the cap may include a cap face for protecting at least a portion of a front surface of the flange, the cap face comprising a handle; the cap may further include at least two cap securing members releasably engagable with an inner surface of the flange in an interference fit; and 2) a cover device for covering both the cap and the flange, the cover device may include a cover face for protecting the front surface of the flange, the cover face comprising an outer periphery; the cover device may further include an integrally-formed lip depending from the outer periphery of the cover face and perpendicular to the cover face, the lip comprising at least two cover securing members that are releasably engagable with a peripheral edge of the flange.

In accordance with another aspect, the cover device may receive the cap face in a snug fit.

In accordance with another aspect, the cover face may have a cavity adapted to receive the cap face in a friction fit.

In accordance with yet another aspect, the cap face and the cover face may be co-axial along a central axis.

In accordance with one aspect, the at least two securing members may be integrally formed with the lip.

In accordance with another aspect, one of the at least two cover securing members may include a cantilever clip.

In accordance with another aspect, one of the at least two cover securing members may be adapted to engage the peripheral edge of the flange in a friction fit.

In accordance with yet another aspect, the cap face may further include a recess, and the handle may extend from a first side of the recess to a second side of the recess.

Many further features and combinations thereof concerning embodiments described herein will appear to those skilled in the art following a reading of the instant disclosure.

DESCRIPTION OF THE FIGURES

In the figures, embodiments of the invention are illustrated by way of example. It is to be expressly understood that the description and drawings are only for the purpose of illustration and as an aid to understanding, and are not intended as a definition of the limits of the invention.

FIG. 5 is a side view of the cover device in accordance with some embodiment;

FIG. 6 is a bottom view of the cover device in FIG. 1;

FIG. 7 is another side view of the cover device in accordance with some embodiment;

FIG. 8 is a cross-sectional view along section BB of the cover device in FIG. 7;

FIG. 9 is an enlarged view of call-out region C of the cover device in FIG. 8;

FIG. 10 is another bottom view of the cover device in FIG. 1 in accordance with some embodiment;

FIG. 11 is a cross-sectional along section EE view of the cover device in FIG. 10;

FIG. 12 is an enlarged view of call-out region F of the cover device in FIG. 11;

FIG. 13 is an enlarged view of call-out region K of the cover device in FIG. 10;

FIG. 15 is a bottom view of the cover device engaged with a flange in accordance with some embodiment;

FIG. 16 is a cross-sectional view along section JJ of the cover device engaged with the flange in FIG. 15;

FIG. 17 is a cross-sectional view along section GG of the cover device engaged with the flange in FIG. 15;

FIG. 18 is an enlarged view of call-out region H of the cover device in FIG. 17;

FIG. 20 is a top view of a cap in accordance with some embodiments;

FIG. 21 is a cross-sectional view along section BB of the cap in FIG. 20;

FIG. 22 is a bottom view of the cap in accordance with some embodiments;

FIG. 23 is a side view of the cap in accordance with some embodiments;

FIG. 24 is an enlarged view of call-out region T of the cap in FIG. 23;

FIG. 25 is an enlarged view of call-out region R of the cap in FIG. 23;

FIG. 26 is a top view of the cover device in FIG. 19 with a cap stored therein in a storage position in accordance with some embodiments;

FIG. 27A is a cross-sectional view along section UU of the cover device with the cap stored therein in FIG. 26;

FIG. 27B is an enlarged view of the call-out region V of the cover device with the cap stored therein in FIG. 27A;

FIG. 30 is a bottom view of the cover device in FIG. 19;

FIG. 31 is a cross-sectional view along section NN of the cover device in FIG. 30;

FIG. 32 is an enlarged view of call-out region P of the cover device in FIG. 31;

FIG. 33 is a side-by-side view of two cover devices in accordance with some embodiments;

FIG. 36 is a top view of a cover device in accordance with some embodiments;

FIG. 37 is a cross-sectional view along section YY of the cover device in FIG. 36;

FIG. 40 is a top view of a cap cover in accordance with some embodiments;

FIG. 41 is a perspective view of a cap device including a cap cover and a retainer;

FIG. 42 is a top view of a cap cover with example dimension information in accordance with some embodiments;

FIG. 43 is a bottom view of a cap cover with example dimension information in accordance with some embodiments;

FIG. 44 is a side view of a cap cover with example dimension information in accordance with some embodiments;

FIG. 45 is a perspective view of a retainer with example dimension information in accordance with some embodiments;

FIG. 46 is a bottom view of a retainer with example dimension information in accordance with some embodiments;

FIG. 47 is a side view of a retainer with example dimension information in accordance with some embodiments;

FIG. 48 is a side view of a cap device with a cap cover and a retainer in accordance with some embodiments;

FIG. 49 is a cross-sectional view of the cap device in FIG. 48 along section R-R;

FIG. 50 is an enlarged top view of call-out region Q of cap device in FIG. 43;

FIG. 51 illustrates an example cap cover made of a transparent material;

FIGS. 58 to 60 illustrate various configurations of an example cap cover engaged with an example retainer and an example cover device in accordance with some embodiments.

DETAILED DESCRIPTION

Figure 1:
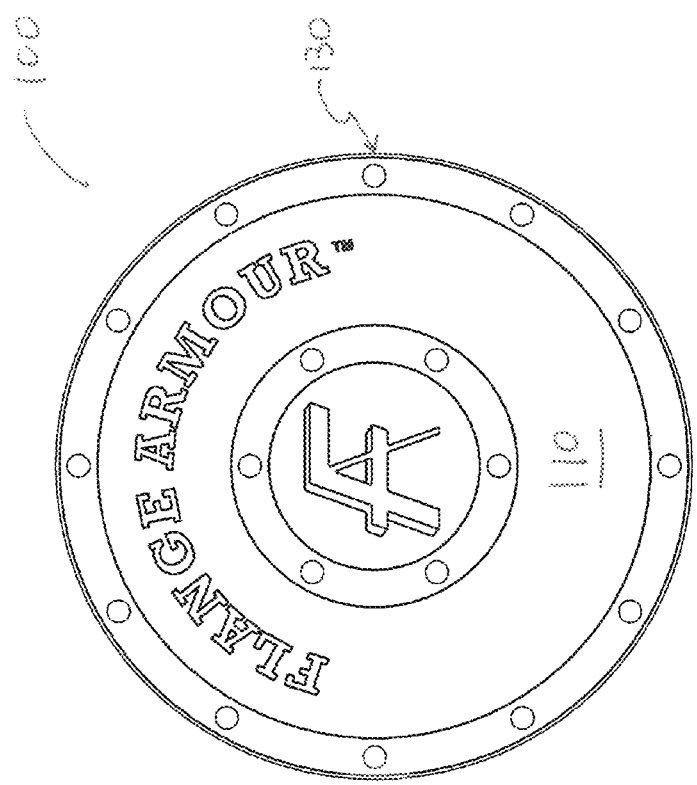
FIG. 1 is a top view of a cover device in accordance with some embodiment.

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

It is noted that various connections are set forth between elements in the following description and in the drawings. It is noted that these connections in general and, unless specified otherwise, may be direct or indirect and that this specification is not intended to be limiting in this respect. Further, the term "connected" or "coupled to" may include both direct coupling (in which two elements that are coupled to each other contact each other) and indirect coupling (in which at least one additional element is located between the two elements).

In the present disclosure, various embodiments of a cover device 100 and of a cap device (or simply a "cap") 200, 600 are described. The cover device 100 or the cap device 200, 600 can be used to protect various sizes or classes of flanges 400 during transportation, assembly and further upstream and/or downstream works. In particular, the cover device 100 may help reduce or eliminate the use of tools such as knives, wrenches, screwdrivers, bolts, or masking tapes used on flanges during fabrication, assembly, piping spool, shipping preparation, transportation or removal of protection at client sites, where such tools may be required to facilitate protection of flanges.

In one embodiment the cover device 100 or the cap device 200, 600 may be reusable and recyclable. For example, the cover device 100 or the cap device 200, 600 may be used for site preservation of flanges. In some embodiments, the cover device 100 or the cap device 200, 6—may be used to preserve or protect flanges of various sizes or classes. In some embodiments, the cover device 100 or the cap device 200, 600 may be made of polyester, plywood or any other suitable material.

In one embodiment, the cover device 100 or the cap device 200, 600 can help to reduce or eliminate the defects and damage caused by current handling and transportation processes. As described below, the cover device 100 and the cap device 200, 600 may work independently, each affecting protection of a flange 400 on its own. In another embodiment, the cover device 100 and the cap device 200, 600 may both be installed on or fitted with the flange 400 at the same time to provide reinforced protection.

A user may have the option to protect a full flange 400 by using a cover device 100 without a cap device 200, 600. The user may also choose to protect a portion of the flange 400, e.g. a raised face portion 410 ("raised face 410") of the flange 400, by using a cap device 200, 600 without the cover device 100. For example, it may be desirable to only protect the raised face 410 of the flange during the fabrication, sandblasting and painting stages. The cap device 200 can help improve efficiencies in production and to reduce damage and defects to a raised face 410 of the flange 400. In addition, if a user further chooses to use the cover device 100 for protection of the front surface 425 flange during shipment, the user can simply secure the cover device 100 on top of the flange 400, which may have the cap device 200, 600 already installed thereon. The customer can have the freedom to choose any configuration depending on the particular needs.

FIG. 1 shows a top view of a cover device 100 in accordance with an example embodiment. The cover device 100 may have an annular shape, though it may have any other shape that is suitable to receive and engage a flange. The cover device 100 has a face 110 with an outer edge or periphery 130. The face has a front surface and a back surface (not shown in FIG. 1). The front surface of face 110 may have any kind of suitable patterns or designs imprinted thereon, such as a logo or a brand name (e.g. "FLANGE ARMOUR™"). In another embodiment, the front surface of face 100 can be entirely blank.

Figure 2:
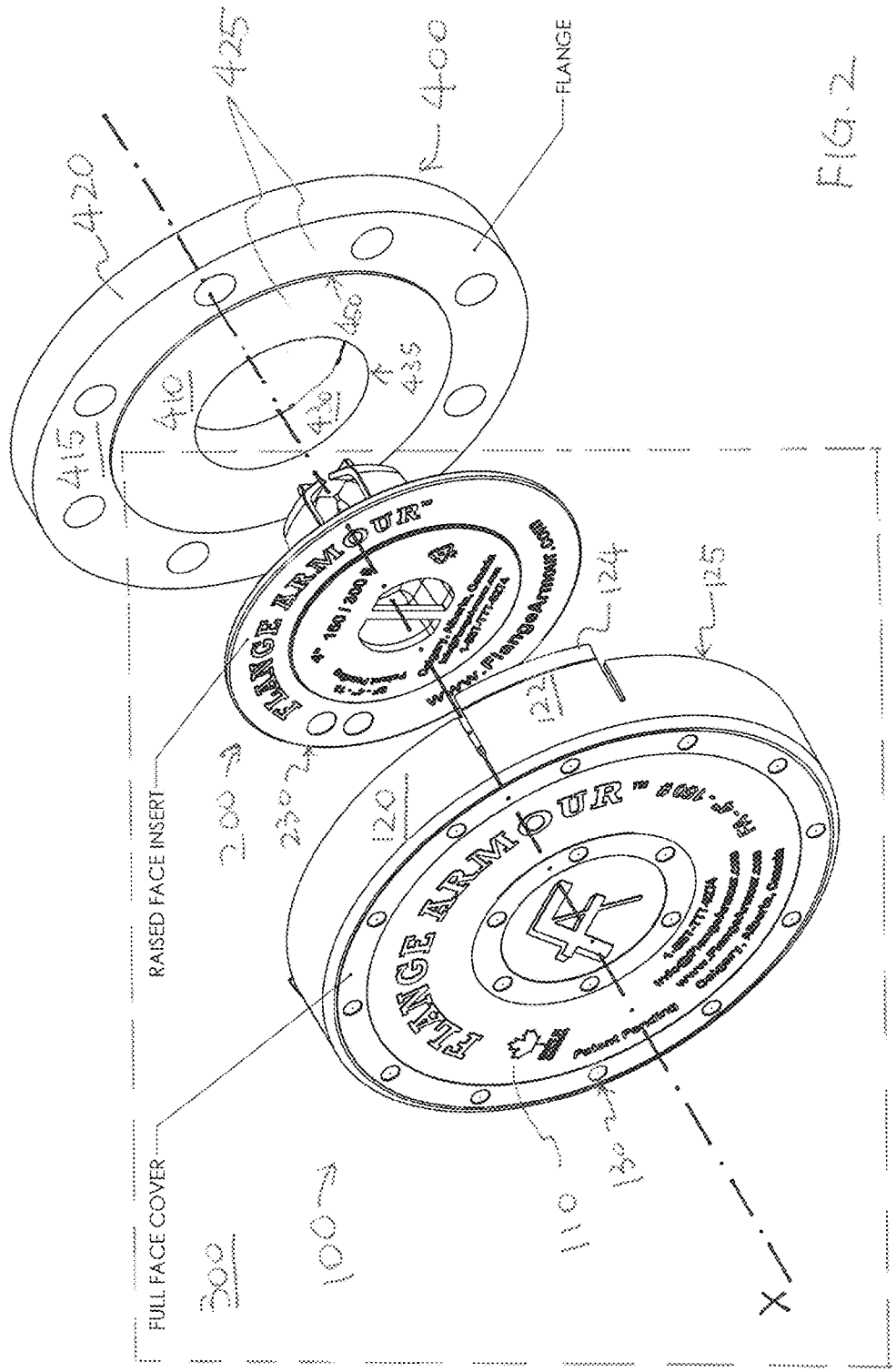
FIG. 2 is a perspective view of the cover device, a cap and a flange in accordance with some embodiment.

Referring now to FIG. 2, which is a perspective view of the cover device 100, a cap device 200 (a cap may also be referred to as an "insert") and a flange 400 in accordance with some embodiment. As shown the flange 400 may be in a disk shape. The flange 400 may have a front surface 425, which may include a gasket surface 410 and a bolting surface 415 surrounding the gasket surface 410 with bolting holes. The gasket surface 410 may be a raised face compared to the bolting surface 415, or it may be on the same plane as the bolting surface 415. The gasket surface 410 may be ring-shaped, bounded by a first edge 435 and a second edge 450. The bolting surface 415 is bounded by edge 450 and peripheral edge 420 of the flange 400. The cap face and the cover face may be co-axial along a central axis X.

The cover device 100 has a face 110 bounded by outer edge or periphery 130, and further comprises a lip 120 with an edge 125, the lip 120 depending from the outer periphery 130. Lip 120 may be integrally formed with face 110. Lip 120 may be circumferential as shown, or may be any other suitable shape corresponding to a shape of the face. The circumferential lip 120 extends radially the outer edge 130 of the face 110 and is perpendicular to the face 110, the circumferential lip 120 comprising at least two securing members 122 that can releasably engage with the peripheral edge 420 of the flange 400. A securing member 122 may further comprise a clip 124. The clip 124 may be a cantilever clip or may be any other suitable type of clip that can releasably engage with the peripheral edge 420 of the flange 400. When the cover device 100 is fit over the flange 400, the clips 124 may adhere under an underside of the flange 400 and thereby secure it in place. In one embodiment, in order to release the flange 400 from the secure hold of the cover device 110, a user can grip the clips 124 one or more at a time, then pull the cover device 100 to release the flange 400.

The cover device 100 and the cap device 200 (collectively 300) may both engage with the flange 400 at the same time. That is, a user can insert the cap device 200 into the flange 400 to protect the gasket surface 410, and then fit the flange 400 with the cover device 100, so that the entire front surface 425 and the peripheral edge 420 of the flange are also protected.

Figure 3:
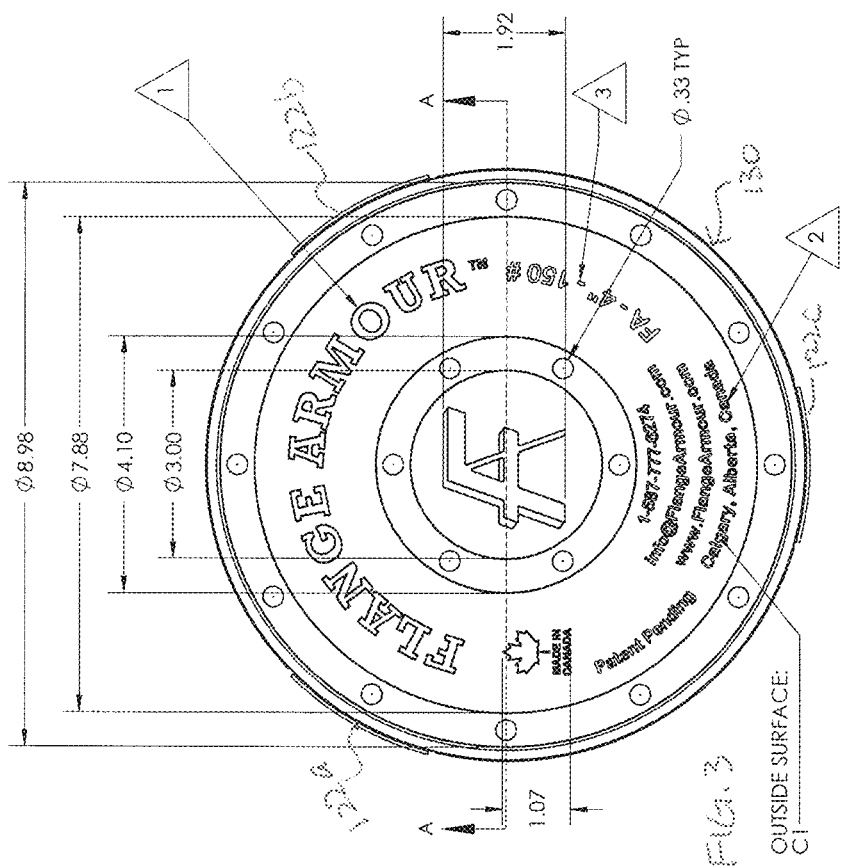
FIG. 3 is another top view of the cover device in accordance with some embodiment.

FIG. 3 is another top view of the cover device in accordance with some embodiments. The cover device 100 may have three securing members 122a, 122b, 122c spaced evenly along the circumferential lip 120. It is to be appreciated that there may be more than three securing members 122.

Figure 4:
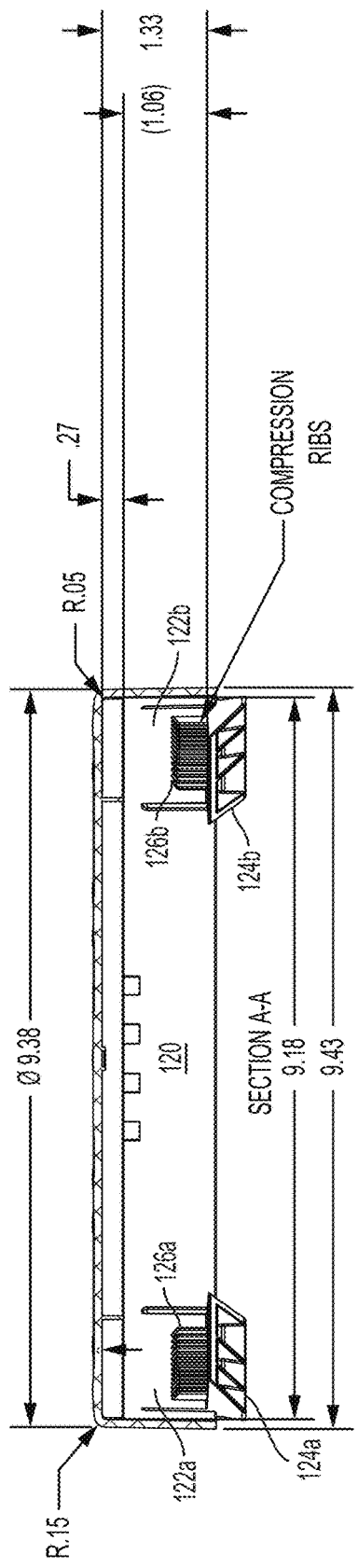
FIG. 4 is a cross-sectional view along section AA of the cover device in FIG. 3.

FIG. 4 is a cross-sectional view along section AA of the cover device in FIG. 3. In one embodiment, each securing member 122a, 122b may further include clips 124a, 124b, and compression ribs or bars 126a, 126b. The compression ribs 126 may extend outwardly from an end of clips 124, parallel to the body of the circumferential lip 120. The compression ribs 126 may be integrally formed with the securing members 122 and/or the clips 124. The compression ribs 126 may provide a tight or snug fit against the peripheral edge 420 of the flange 400, when the cover device 100 is engaged with the flange 400, as shown in FIGS. 11 and 12. In addition, as shown in FIGS. 8 and 9, the compression ribs 126 may provide a tight fit to the flange, even as the flanges vary in size, as the ribs 126 can be placed above the clip 124 to enable the clips to adapt to variations in flange sizes (e.g. outside diameter or OD).

FIGS. 5 and 7 both provide a side view of the cover device 100 in accordance with some embodiment. As can be seen, the securing members 122 may have a flexible portion integrally formed with the circumferential lip 120. The flexible portion may be further integrally formed with a clip 124 that can be adapted to engage the peripheral edge 420 of the flange 400 in a variety of manners such as snap-fit, friction-fit, or press-fit. The flexible portion can allow the clip 124 to hook onto and unhook from the flange 400 without damage.

Figure 14:
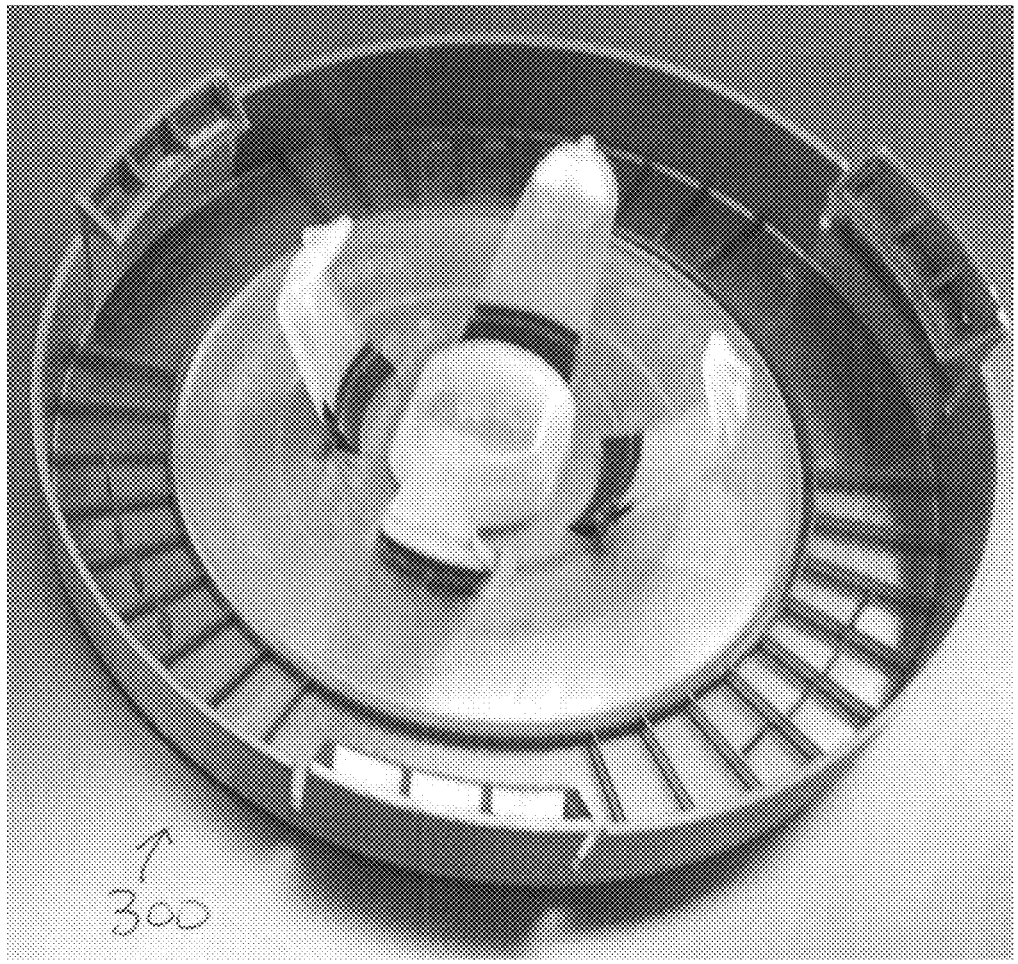
FIG. 14 demonstrates a cover device and a cap engaged therein in accordance with some embodiment.

FIGS. 6 and 10 both provide a bottom view of the cover device 100 in FIG. 1. Crush ribs 140, 150 may be placed along the annular ring-shaped region 117, defined by one end of an inner ring-like protrusion 113 and the outer edge 130 of the face 110. The number of crush ribs 140 in a group 150 of crush ribs along the annular region 117 may be any suitable amount, not limited to the four crush ribs 140 in a group 150 as illustrated in the drawings. For example, the number of crush ribs 140 in a group 150 of crush ribs may be six or ten, which may be dependent on the size of the cover device 100. The inner protrusion 113 defines a central cavity 115 in the shape of a circle on the underside surface of the face 100. The cavity 115 may be adapted to receive the face 210 of the cap device 200 in a friction-fit, as shown in FIG. 14. This configuration can allow the user to "snap" the cover device 100 in place, by a pressing motion, onto a flange 400 already fitted with the cap device 200.

In another embodiment, a raised face 240 of the cap device 200, instead of the entire face 210, may be received by the cavity 115.

In one embodiment, the crush ribs may be at least one set or group 150 of horizontal crush ribs 140 placed substantially parallel to the inner protrusion 113 and the circumferential lip 120. The height of the horizontal crush ribs 140 may be substantially or exactly the same as the height of the inner protrusion 113.

In another embodiment, the crush ribs may be at least one set or group of vertical ribs 150 extending radially from the inner protrusion 113 and ending at the outer edge 130 of the face 110. The height of the vertical crush ribs 150 may be substantially or exactly the same as the height of the inner protrusion 113.

In yet another embodiment of the invention, the horizontal crush ribs 140 and the vertical crush ribs 150 may both be placed in region 117 to accommodate for various heights of flanges 400. The crush ribs 140, 150 can help improve the tolerance level of the cover device 100 when engaging with different flanges with varying heights. Keeping a tight fit around flanges.

Different views of the compression ribs 126 or the crush ribs 140, 150 are further demonstrated in FIGS. 8, 9, 11, 12 and 13, particularly in call-out regions C, F and K.

As shown in FIG. 12, the tip or head of the clip 124 may comprise a 90-degree hook face. Alternatively, it may also comprise an angled hook face (not shown) to facilitate easy removal. As mentioned, the flexible portion of securing member 122 can allow the clip 124 to hook onto and unhook from the flange 400 without damage. The compression ribs 126 may further help the securing members 122 to engage with different sizes of flanges.

FIG. 14 shows an assembly 300 of a cover device 100 with the face 210 of a cap device 200 received within the cavity 115 of the cover device 110 in a friction fit.

Referring now to FIGS. 15-18, a cover device 100 is shown covering a flange 400. FIG. 15 is a bottom view of the cover device engaged with a flange in accordance with some embodiment; FIG. 16 is a cross-sectional view along section JJ of the cover device engaged with the flange in FIG. 15; FIG. 17 is a cross-sectional view along section GG of the cover device engaged with the flange in FIG. 15; and FIG. 18 is an enlarged view of call-out region H of the cover device in FIG. 17;

FIGS. 15 and 16 demonstrate that the clips 124 may engage with an underside of the flange 400 in a snap-fit or interference fit. As can be seen from FIGS. 17 and 18, compression ribs 126 are directly contacting the surface of the peripheral edge 420 of the flange 400.

Figure 19:
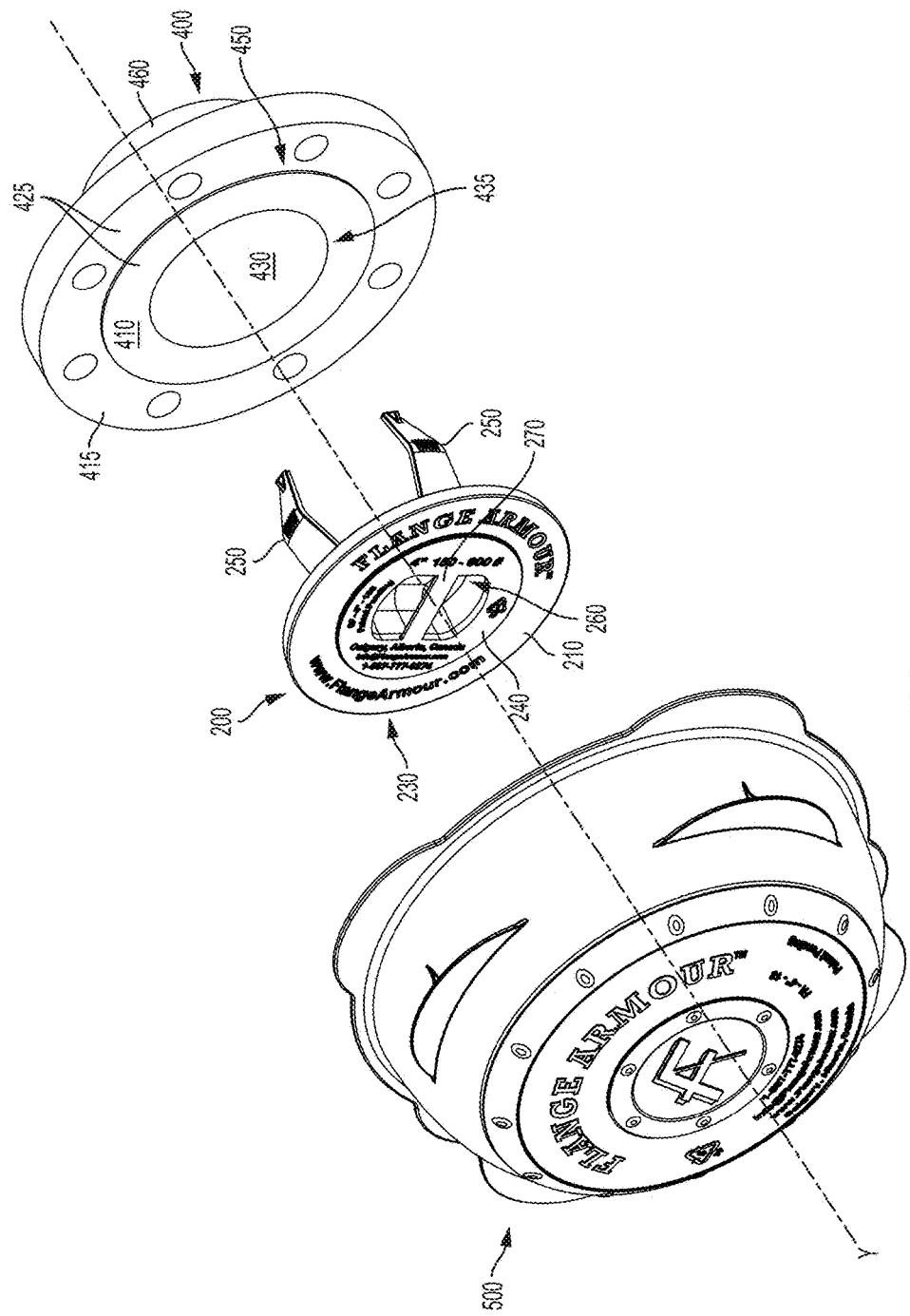
FIG. 19 is a perspective view of a cover device, a cap and a flange in accordance with another embodiment.

FIG. 19 is a perspective view of a cover device 500, a cap device 200 and a flange 400 in accordance with another embodiment. Also referring to FIG. 20, the cap device 200 has a face 210 (also referred to as the cap face 210) bounded by an outer edge or periphery 230. The size of the face 210 can substantially correspond to the size of a raised face or a gasket surface 410 of the flange 400, such that when fully inserted into the flange 400, the cap device 200 can adequately protect the raised face or gasket surface 410 of the flange 400. The cover device 500 and the cap device 200 may be co-axial along a vertical axis Y.

The face 210 may further include a central region 240 that may be raised (also referred to as "raised face 240") or may be on the same plane as the rest of the face 210. The central region 240 may include a recess 260 adapted to receive user's fingers for easy operation of the cap device 200. The central region 240 may also include a handle 270, for easy user access and handling, extending from one side of the recess 260 to the opposite end of the recess 260. The cap device 200 may further include at least two securing members 250 for releasably engaging with flange 400. For example, securing members 250 may be releasably engaged with internal surface 430 of flange 400. The securing members 250 can be substantially perpendicular to, and internally formed with the face 210 of the cap device 200. The flange 400 has an internal surface 430 extending from the inner surface of the front face 425 to the internal surface of the pipe portion 460. The internal surface 430 may have an industry-defined size ID, based on which a cover device 100, 500 or a cap device 200 may be designed.

In one embodiment, a raised face 240 of the cap device 200 may be tightly pressed against the underside surface of the face 110 of the cover device 100 when the face 210 of the cap device 200 is received by the cavity 115 of the face 110 of the cover device 100.

FIGS. 20-25 further demonstrate various aspects of the cap device 200. FIG. 20 is a top view of a cap in accordance with some embodiments; FIG. 21 is a cross-sectional view along section BB of the cap in FIG. 20; FIG. 22 is a bottom view of the cap in accordance with some embodiments; FIG. 23 is a side view of the cap in accordance with some embodiments; FIG. 24 is an enlarged view of call-out region T of the cap in FIG. 23; and FIG. 25 is an enlarged view of call-out region R of the cap in FIG. 23.

Referring now to FIGS. 20 and 21, the recess 260 of cap device 200 may be shaped in such a way as to allow a user to put his or her fingers in and to grip onto the handle 270 of the cap device 200 when the user inserts or removes the cap device 200 from the flange 400.

FIG. 22 further shows an underside surface 215 of the face 210 of cap device 200, the underside surface 215 may be integrally formed with the at least two cap securing members 250.

FIGS. 23 and 24 show a plurality of contact ribs 280 on each of the cap securing members 250. The plurality of contact ribs 280 can further help grip the inner surface of the flange when the cap device 200 is engaged with the flange.

In one embodiment, a cap securing member 250 may be in the form of a brace arm as shown in FIGS. 21 and 23.

FIG. 25 shows an optional tip or head 290 on each of the cap securing member 250 for engaging the cover device 500 in a storage position as shown in FIGS. 26, 27A and 27B. FIG. 26 is a top view of the cover device in FIG. 19 with a cap stored therein in a storage position in accordance with some embodiments; FIG. 27A is a cross-sectional view along section UU of the cover device with the cap stored therein in FIG. 26; and FIG. 27B is an enlarged view of the call-out region V of the cover device with the cap stored therein in FIG. 27A; As can be seen in FIGS. 27A and 27B, the tip 290 can engage the cover device 500 in an interference fit in a storage position of the cap device 200 in cover device 500.

Figure 29:
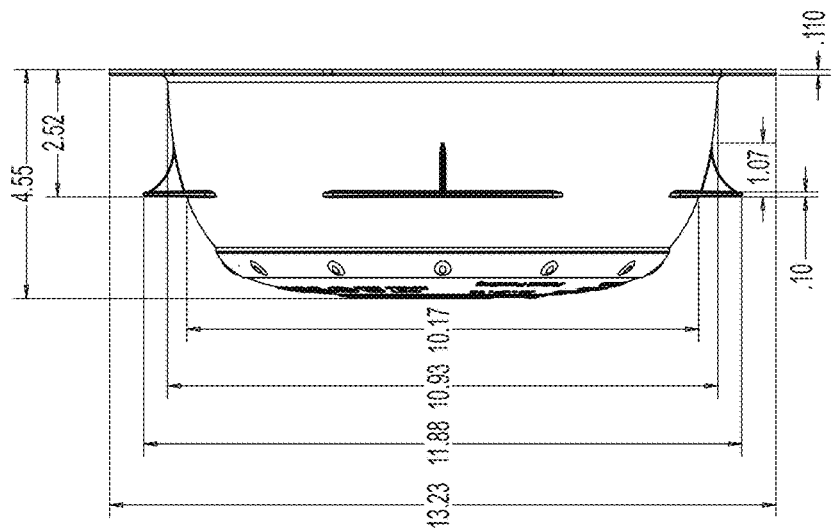
FIG. 29 is a side view of the cover device in FIG. 19.
Figure 28:
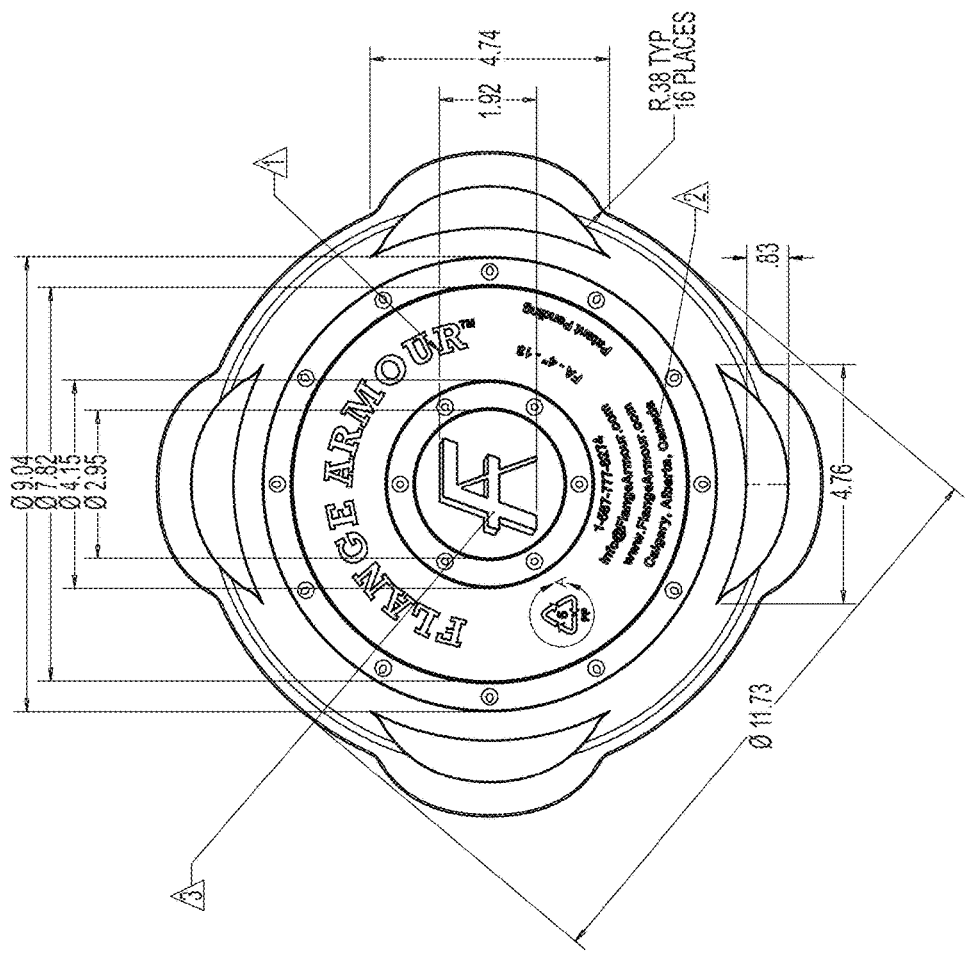
FIG. 28 is a top view of the cover device in FIG. 19.
Figure 35:
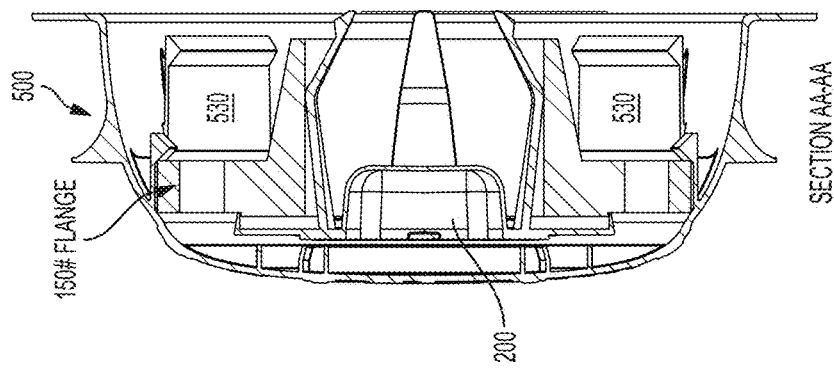
FIG. 35 is a cross-sectional view along section AA-AA of the cover device and the cap stored therein in FIG. 34.
Figure 34:
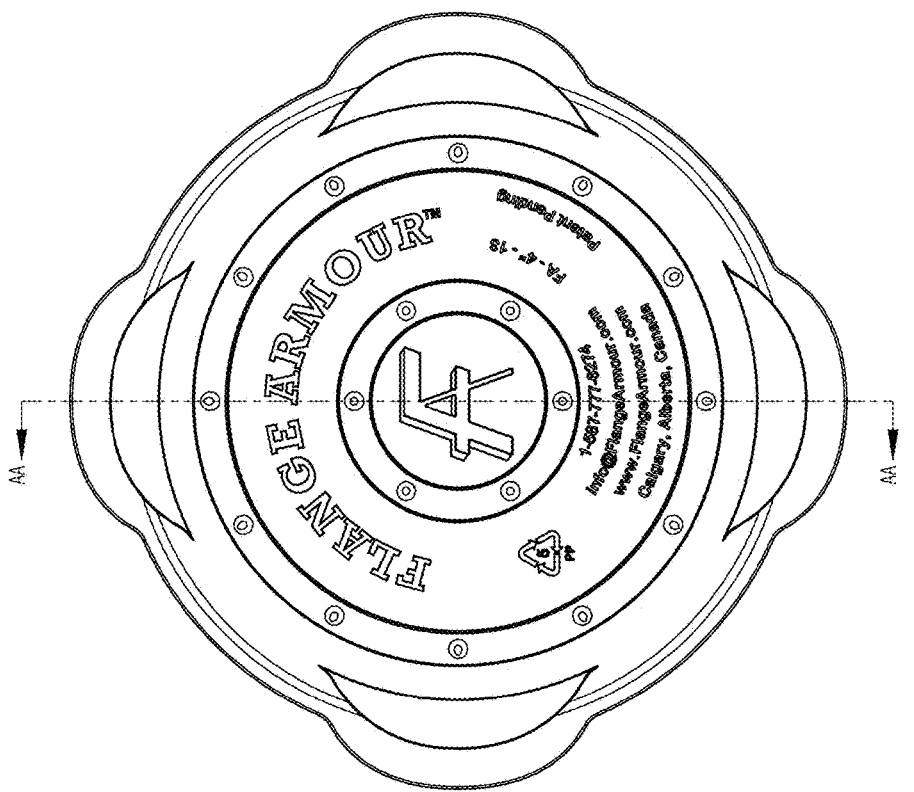
FIG. 34 is a top view of a cover device and a cap stored therein in another storage position in accordance with some embodiments.
Figure 39:
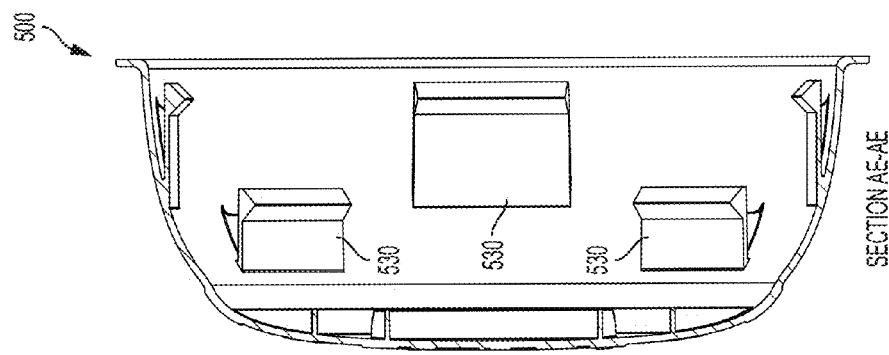
FIG. 39 is a cross-sectional view along section AE-AE of the cover device in FIG. 38.
Figure 38:
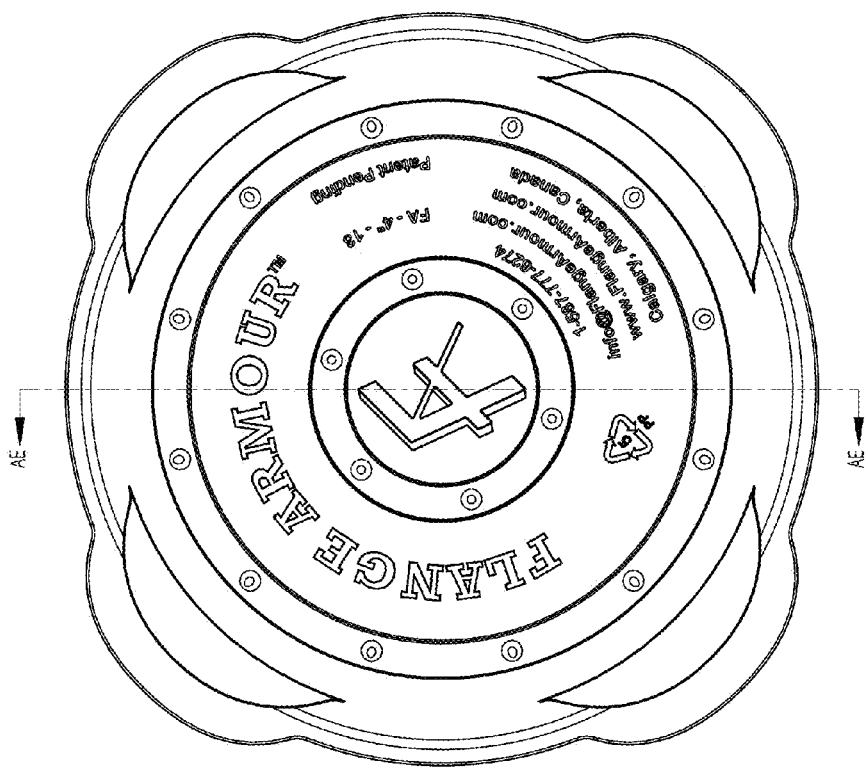
FIG. 38 is a top view of another cover device in accordance with some embodiments.

FIG. 28 is a top view of the cover device in FIG. 19; and FIG. 29 is a side view of the cover device in FIG. 19. FIG. 30 is a bottom view of the cover device in FIG. 19; FIG. 31 is a cross-sectional view along section NN of the cover device in FIG. 30; FIG. 32 is an enlarged view of call-out region P of the cover device in FIG. 31; FIG. 33 is a side-by-side view of two cover devices in accordance with some embodiments; FIG. 34 is a top view of a cover device and a cap stored therein in another storage position in accordance with some embodiments; FIG. 35 is a cross-sectional view along section AA-AA of the cover device and the cap stored therein in FIG. 34; FIG. 36 is a top view of a cover device in accordance with some embodiments; FIG. 37 is a cross-sectional view along section YY of the cover device in FIG. 36; FIG. 38 is a top view of another cover device in accordance with some embodiments; and FIG. 39 is a cross-sectional view along section AE-AE of the cover device in FIG. 38.

As demonstrated by FIGS. 30, 31, 35, 37 and 39, the cover device 500 in one embodiment can have a plurality of securing members 530; one or more of the plurality of securing members 530 can be placed at different locations relative to the face of the cover device 500. The flange 400 may be engaged with the cover device 500 in such a manner as to be held in place by the securing members 530 of different locations within the cover device 500. The cover device 500 may further have a plurality of handles as shown to help facilitate a user with putting the cover device 500 on and off the flange 400.

In operation the cap device 200 can be simply pushed by a user into the space defined by the internal surface 430 of the flange 400. The cap securing members 250 can be resistantly biased to push against the internal surface 430 under tension. In addition, the contact rib(s) 280 on each of the cap securing members 250 may grip the internal surface 430 of the flange 400 in a press-fit. Due to the resistently biased nature of the cap securing members 250, the cap device 200 may be used with more than one flange with varying inside diameters (ID).

In operation the cover device 100 may be fit onto a flange 400 when sufficient force is applied against the securing members 122 of the cover device 100 against the peripheral edge 420 of the flange 400. The centre of the cover device 100 may be aligned with the centre of the flange 400. The flange 400 may or may not already have a cap device 200, 600 inserted therein.

In accordance with another aspect of the invention, various portions of a cap device 600 in one or more embodiments are shown in FIGS. 40 to 50. Cap device (or simply referred to as a "cap") 600 may include a cap cover 320 and a retainer 370.

In one embodiment, as shown in FIG. 41, cap cover 320 and retainer 370 may be releasably engaged to form cap device 600.

As shown in FIGS. 40 to 44, a cap cover 320 may include a face 310 (also referred to as cap face 310) bounded by an outer edge or periphery 330. The size of cap face 310 can substantially correspond to the size of a raised face or a gasket surface 410 of the flange 400, such that when fully inserted into the flange 400, cap cover 320 can adequately protect the raised face or gasket surface 410 of the flange 400.

In one embodiment, face 310 may further include a central region 340 that may be raised (also referred to as "raised face 340") or may be on the same plane as the rest of the face 310. The central region 340 may include a recess 360a, 360b adapted to receive user's fingers for easy operation of the cap cover 320 or cap device 600. The central region 340 may have two recesses 360a and 360b, for easy user access and handling, both recesses may be extending from one side (e.g. front side) of raised face 340 to a bottom end of the cap cover 320.

Referring now to FIGS. 40 to 42, the recess 360a, 360b of cap 400 may be shaped in such a way as to allow a user to put his or her fingers in and to grip onto cap device 600 when the user inserts or removes cap device 600 from the flange 400.

FIG. 43 further shows an underside surface 315 of face 310 of cap cover 320, the underside 315 may include an underside surface 325 of recess 360a, 360b, where the underside surface 325 is a raised surface protruding out of, and integrally formed the rest of underside 315 of face 310, as shown in FIG. 44.

In one embodiment, underside surface 325 may be level with the rest of underside surface 315 of face 310 of cap cover 320.

FIGS. 43 and 44 also demonstrates a raised collar 365 that may be protruding out of underside surface 325. As is described below, raised collar 365 may have a cavity 367 and may be configured to couple or interlock with a portion of a retainer 370.

FIG. 45 shows a retainer 370 with example dimension information. Retainer 370 may include two or more securing members or fins 350 and a shaft 380.

Turning now to FIG. 46 which shows a bottom view of a retainer 370 and FIG. 47 which shows a side view of the retainer 370. As can be seen, each securing member 350 may be integrally formed with shaft 380 on one end, and include a tip 390 on the opposite end. Shaft 380 may be integrally formed with the two or more securing members 350 on one end, and include a notch 385 on the opposite end for releasably engaging with cap cover 320. In one embodiment, the retainer 370 may releasably engage the cap cover 320 in a snap-fit or friction-fit.

Each securing member 350 may be configured to releasably engage, during operation, with flange 400. For example, tip 390 of each securing member 350 may be releasably engaged with internal surface 430 of flange 400. When at rest, each securing member 350 may be positioned at an angle 355 of $\alpha$ (e.g. 52.24 degrees) to shaft 380. During operation, securing members 350 may be inserted into an flange 400 and tips 390 of securing members 350 may engage with internal surface 430 of flange 400 in a friction or interference fit, thereby causing the angle 355 between securing member 350 and shaft 380 to be at a value smaller than $\alpha$. The internal surface 430 may have an industry-defined size ID, based on which a cap cover 320 may be designed. For example, in one embodiment, each of securing member 350 may be in the form of a 4" 150/300# locking fin.

Each securing member 350 may be resistantly biased such that the at least two securing members grip the inner surface of the flange when engaged with the flange.

In one embodiment, raised face 340 of cap device 600 may be tightly pressed against the underside of the face 110 of the cover device 100 when the face 310 of cap device 600 is received by the cavity 115 of the face 110 of the cover device 100.

In one embodiment, tip 390 of securing members or fins 350 may have a plurality of contact ribs (not shown) on each of the cap securing members 350. The plurality of contact ribs can further help grip the inner surface of the flange when cap device 600 is engaged with the flange.

As shown in FIG. 47, shaft 380 may be largely cylindrical, or it may be in any suitable shape or form. Notch 385 may include a first portion 386, a second portion 387 and a third portion 388. The three portions 386, 387, 388 may be co-axial and integrally formed. The first portion 386 and the third portion 388 may have a larger radius than the second portion 387 which is placed between the first and the third portions. This way, a nock 389 may be formed for engaging, such as coupling or interlocking, with collar 365 on cap cover 320 when the cap cover 320 is engaged with the retainer 370 to form cap device 600.

Turning now to FIGS. 48 and 49, where FIG. 49 is a cross-sectional view of cap device 600 in FIG. 48 along section R-R, raised collar 365 may have a cavity 367 formed within, and may be configured to couple or interlock with a portion of a retainer 370 (e.g. notch 385), when cap cover 320 and retainer 370 interoperate to form cap device 600. In one embodiment, notch 385 of retainer 370 may be releasably engaged with raised collar 365 by fitting first portion 386 of notch 385 within cavity 367 of collar 365, as shown in FIG. 49. Collar 365 may be operable to prevent slippage of notch 385 by exerting a force against nock 389 to keep the notch 385 in place when retainer 370 is engaged with cap cover 320.

As shown in FIG. 50, which illustrates an enlarged top view of call-out region Q of cap device in FIG. 43, collar 365 may have an opening 363 on one side, to facilitate receiving of notch 385 of retainer 370 into cavity 367 within collar 365. In one embodiment, retainer 370 may be slidably engaged with cap cover 320 through the opening 363 of collar 365.

Figure 59:
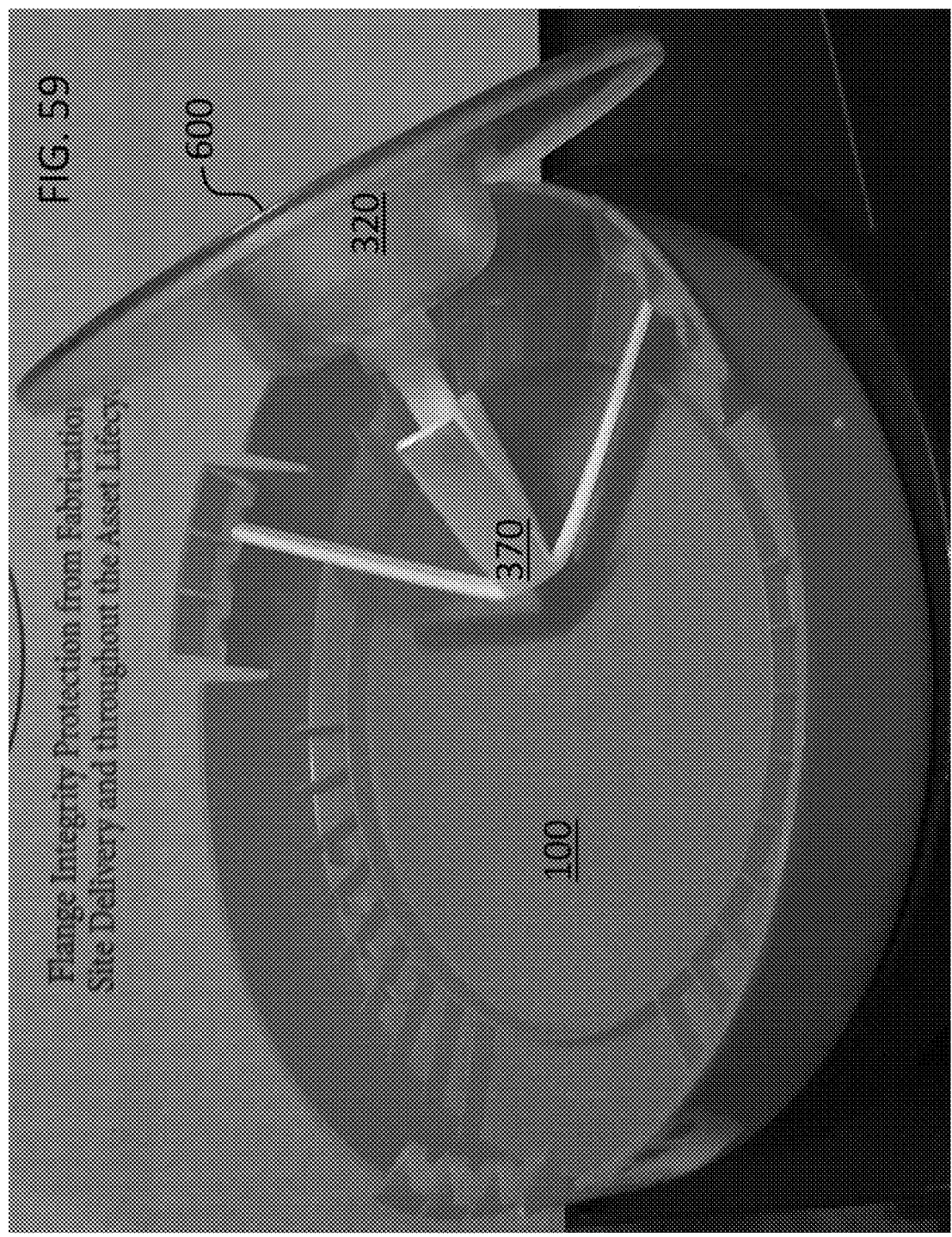

During operation, a user may first insert or slide the retainer 370 into cap cover 320 by engaging notch 385 of retainer 370 with collar 365 of cap cover 320. Once engaged properly, such as shown in FIG. 59, retainer 370 and cap cover 320 may together form cap device 600. User may then push portion of retainer 370 into a flange 400 by exerting a force against cap cover 320 (e.g. against bottom of recess 360a, 360b) towards flange 400. Securing members or fins 350 of retainer 370 may be in whole or part pushed into the annular ring of flange 400, where tips 390 of securing members 350 may engage inner surface 430 of flange 400 in a friction or interference fit. Cap cover 320 may engage with raised surface 410 of flange 400 to protect said raised surface 410. User may then choose to put cover 100 on top of cap device 600 to protect the entire flange 400.

Figure 52:
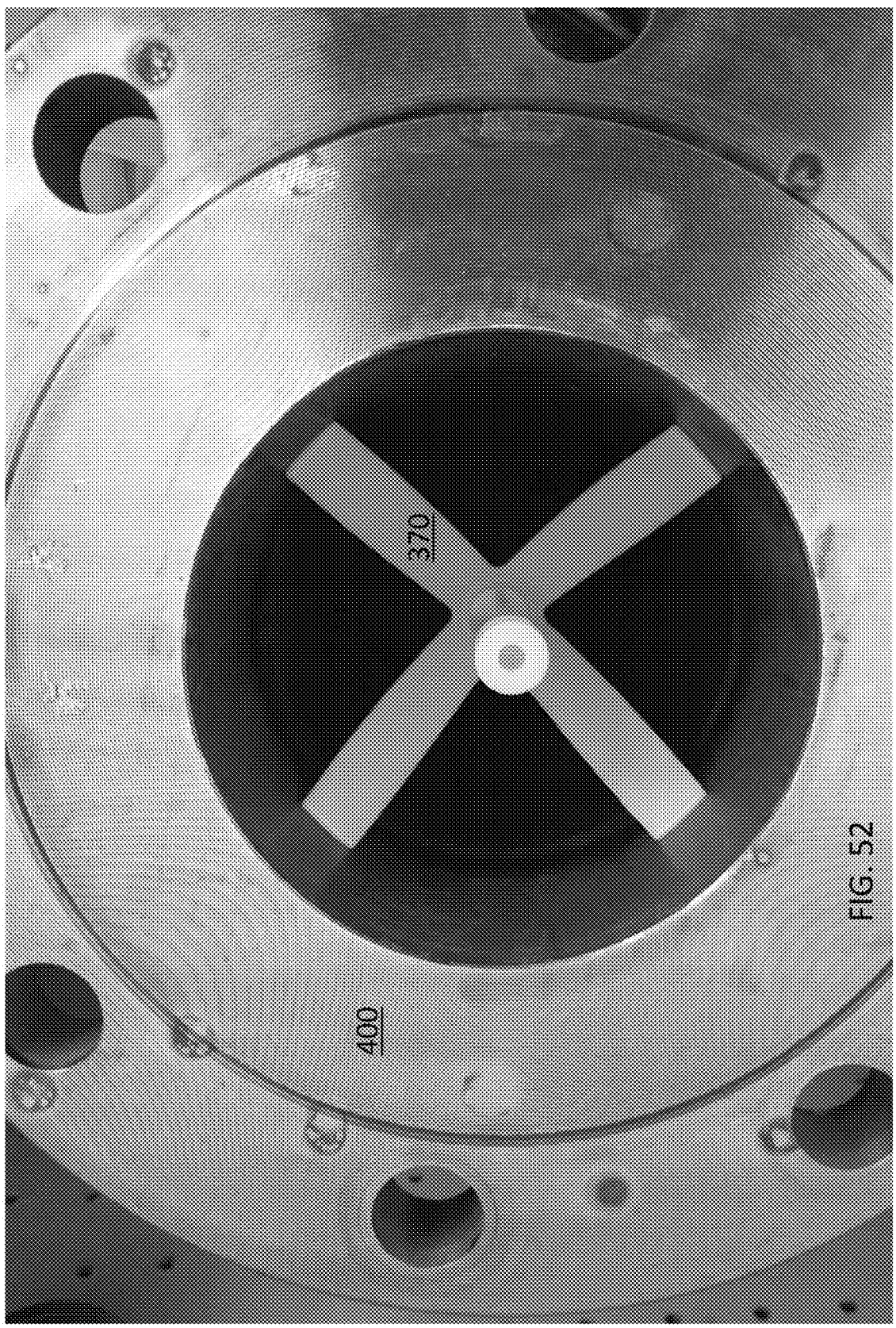
FIG. 52 illustrates an example retainer inserted in a flange.
Figure 53:
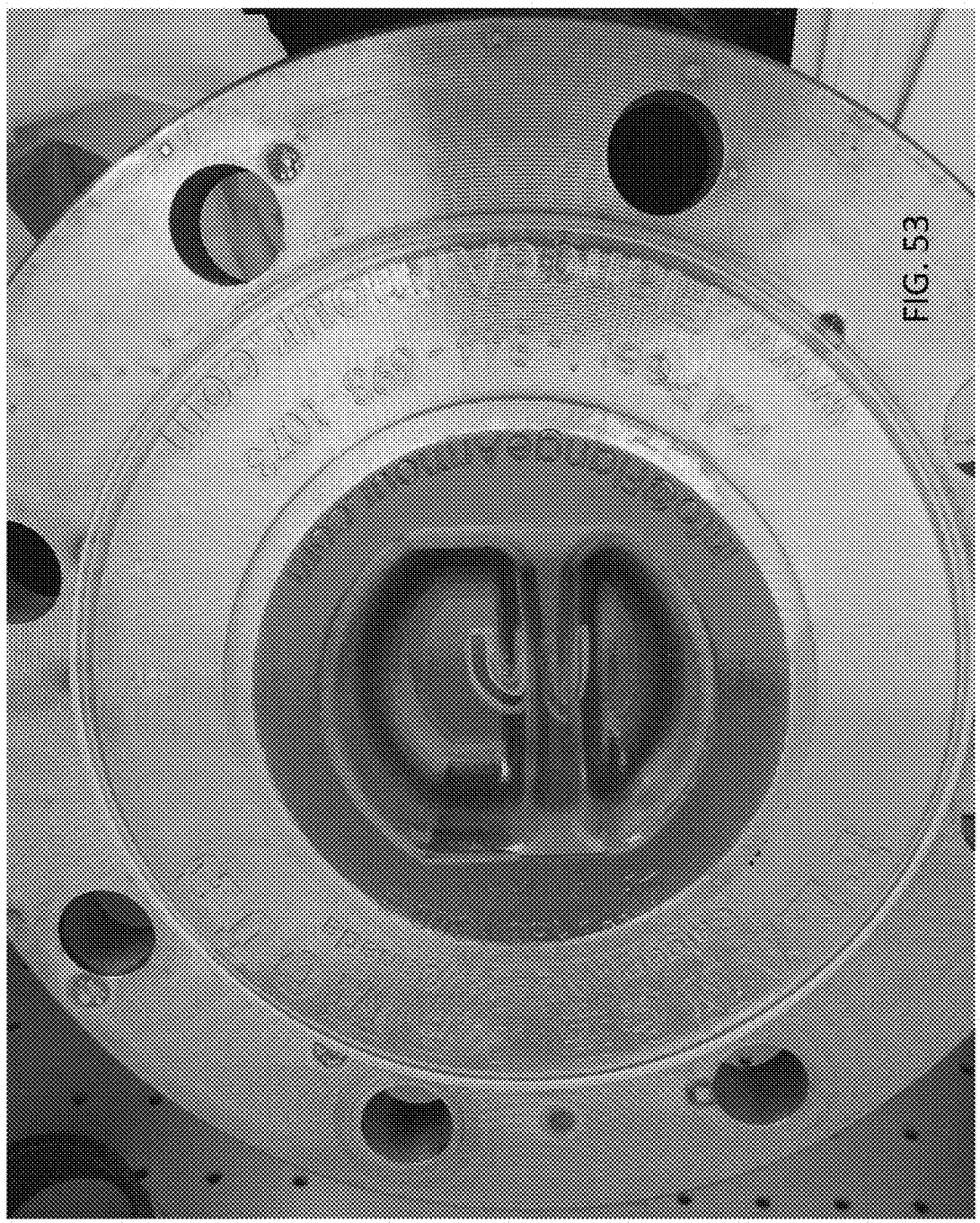
FIG. 53 illustrates an example cap cover fitted on a flange.
Figure 57:
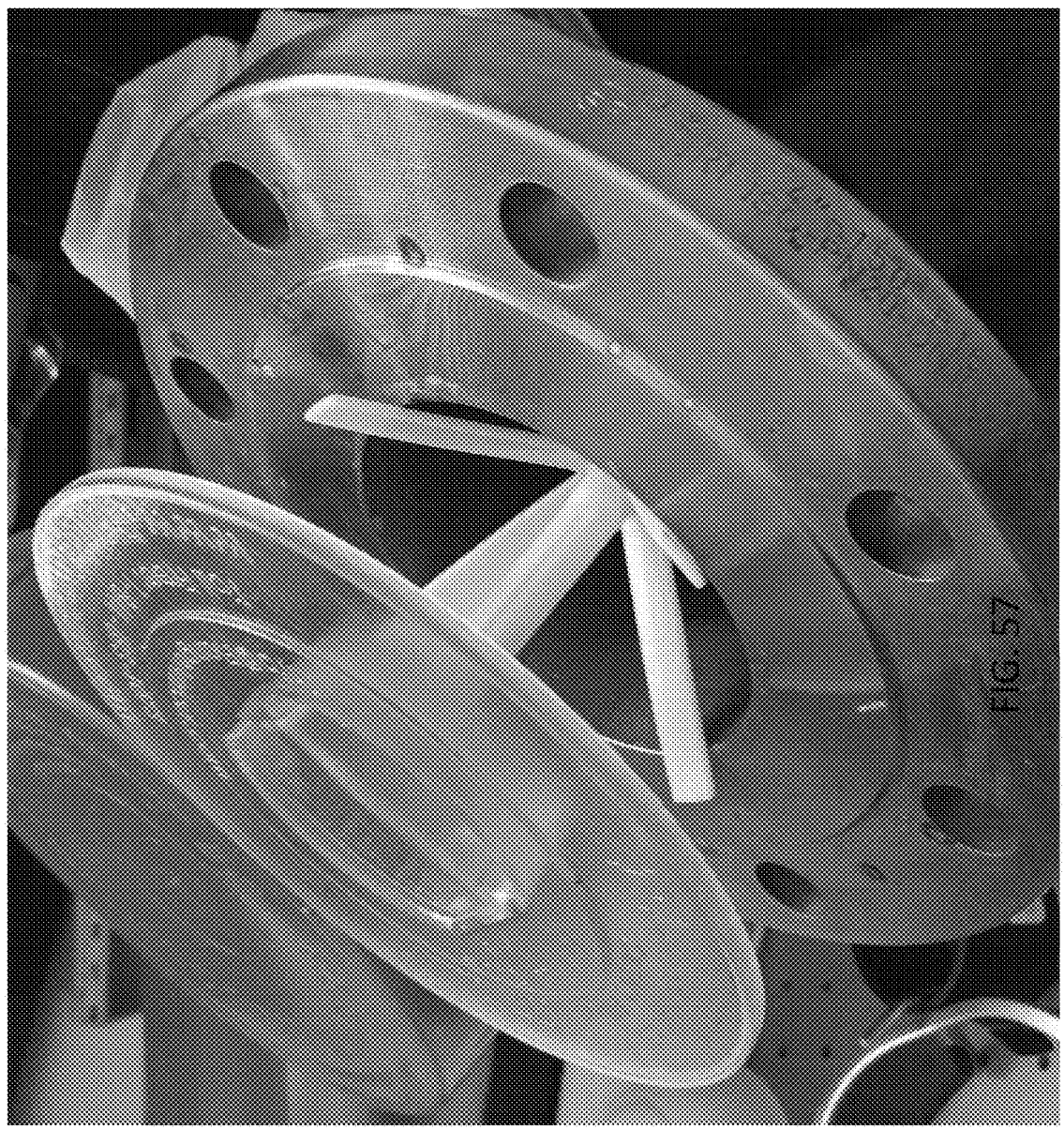
Figure 58:
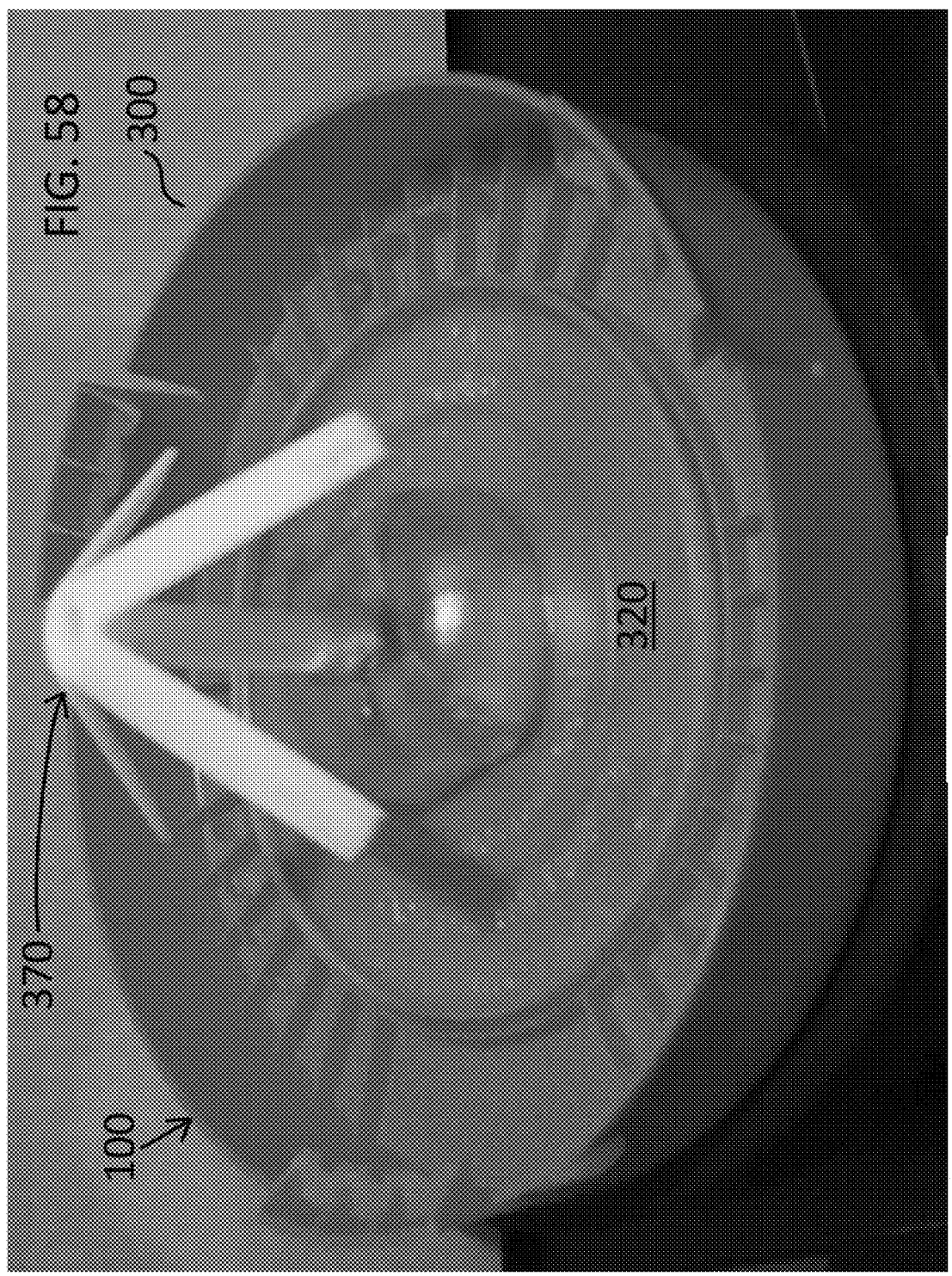

FIGS. 51 to 60 show various configurations of an example cap cover, an example retainer and/or example cover device. For example, FIG. 51 illustrates an example cap cover made of a transparent material; FIG. 52 illustrates an example retainer inserted in a flange; FIG. 53 illustrates an example cap cover fitted on a flange; FIGS. 54 to 57 illustrate various configurations of an example cap cover engaged with an example retainer in accordance with some embodiments; and FIGS. 58-60 illustrate various configurations of an example cap cover engaged with an example retainer and an example cover device in accordance with some embodiments.

Figure 54:
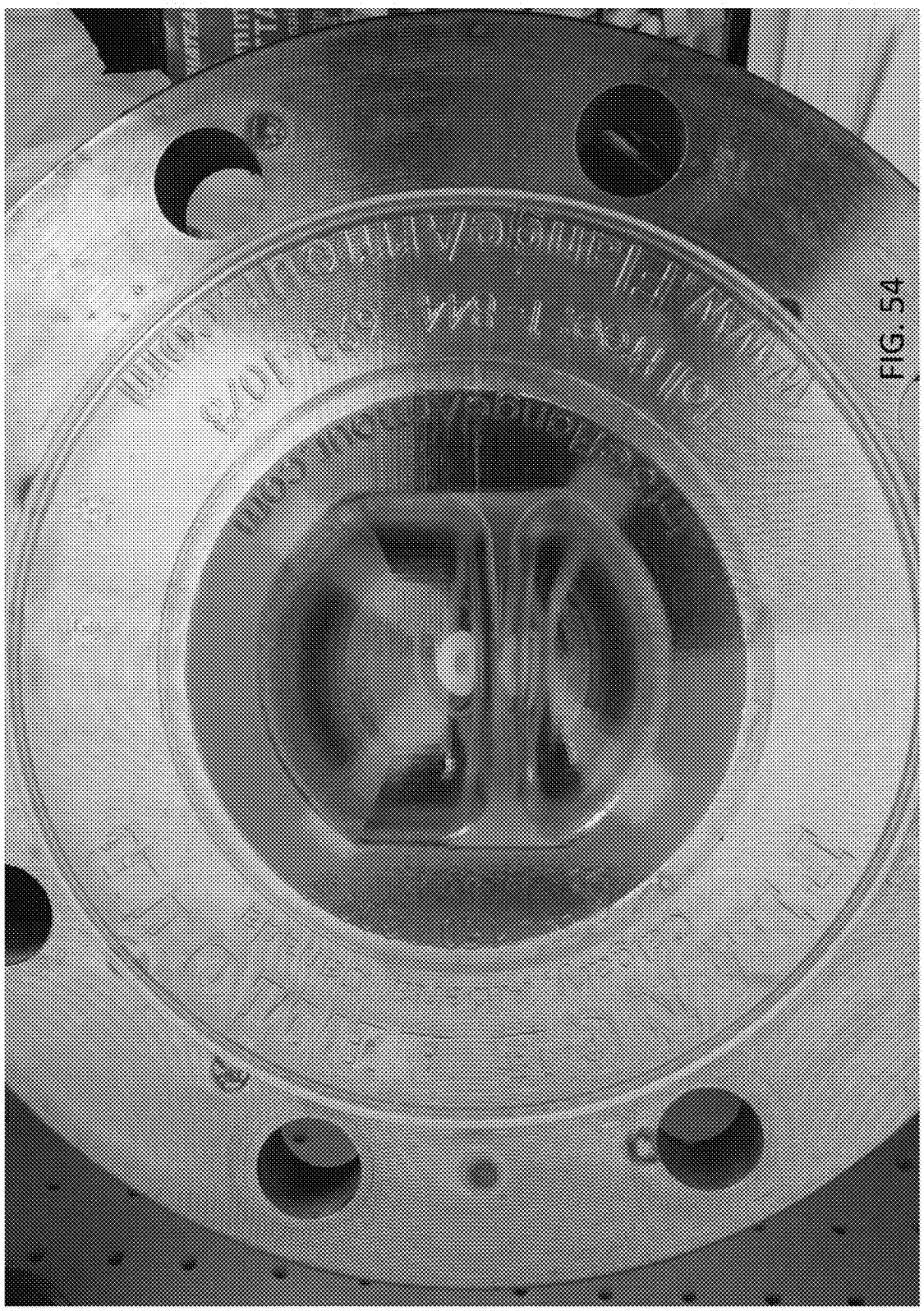
FIGS. 54 to 57 illustrate various configurations of an example cap cover engaged with an example retainer in accordance with some embodiments.
Figure 55:
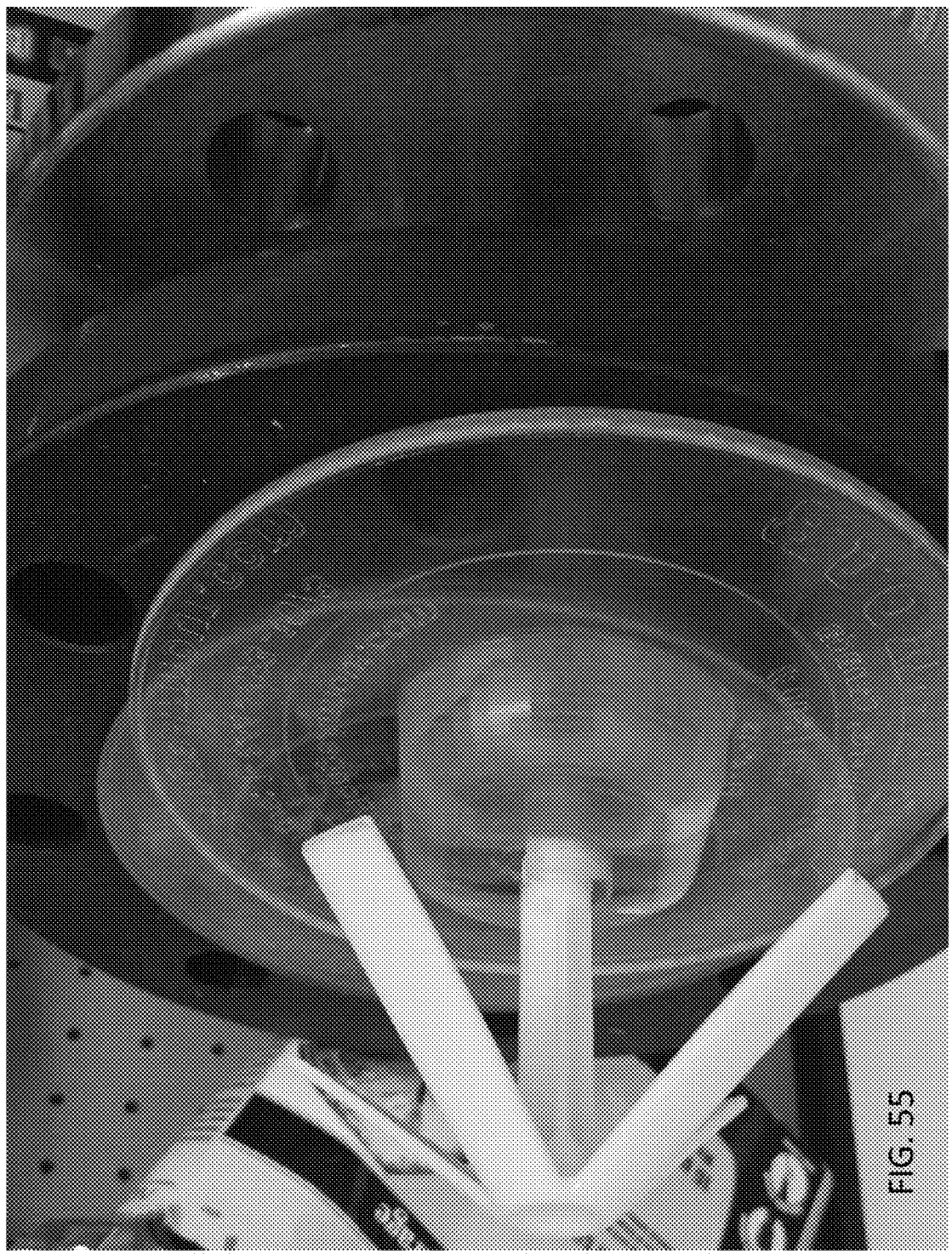
Figure 56:
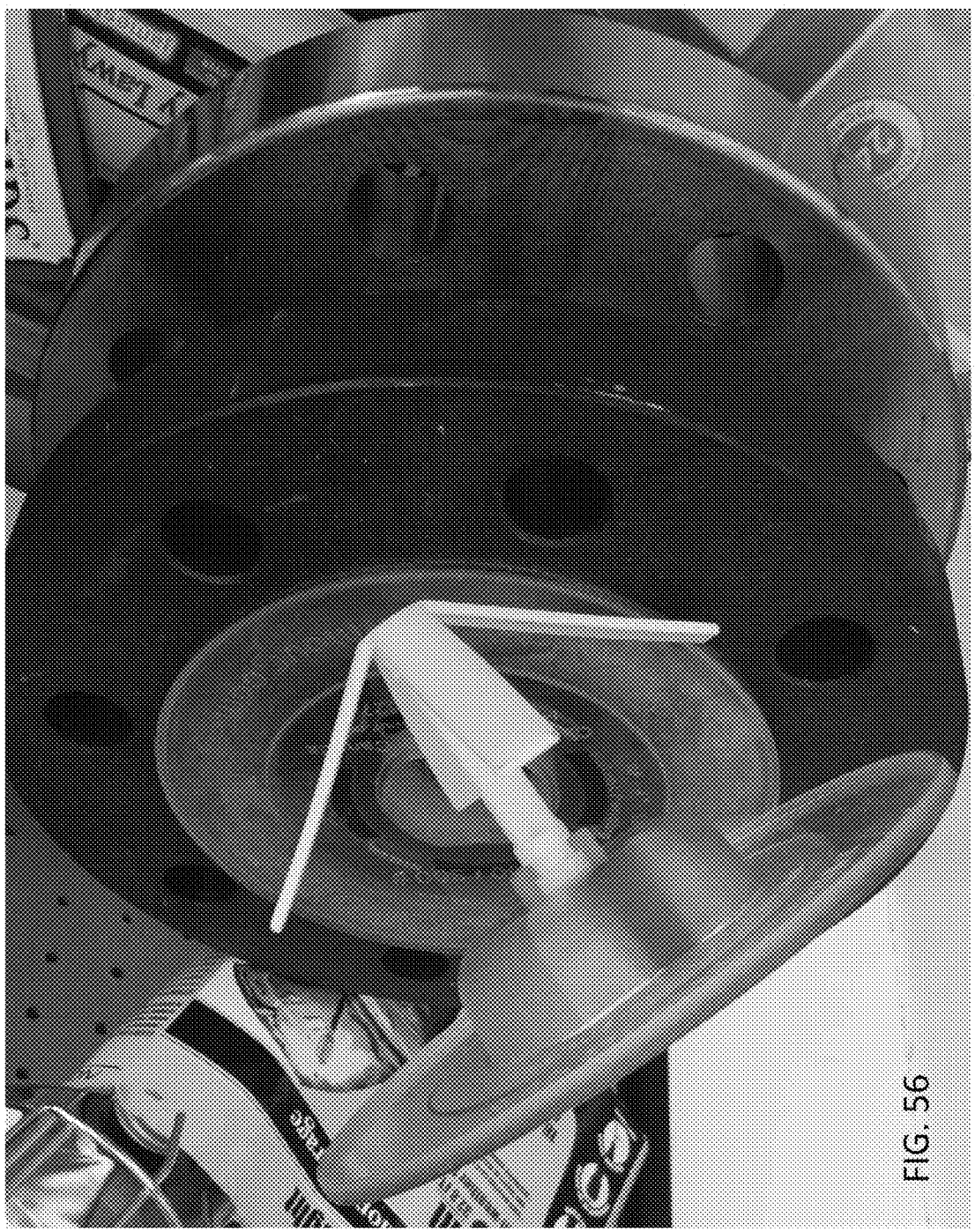

FIG. 57 shows an example retainer 370 interlocked with an example cap cover 320 in the process of being inserted into a flange 400 (user's hand not shown). FIG. 54 shows an example cap cover 320 engaged with an example retainer 370, which is fully inserted into flange 400 during operation. FIG. 58 shows an assembly 300 including a cover device 100, a cap cover 320 releasably engaged with retainer 370.

With the cover device 100 or the cap device 200, 600, a user does not have to rely on tape, plywood or bolts to protect the flanges during fabrication, transportation or handling. Further, the use of cover device and cap device 200 does not require tape, tools such as wrenches, screwdrivers, knives, and so on, such that the risks of damaging the flange is reduced or minimized.

The cover device 100 or the cap device 200, 600 may be made in a variety of suitable materials including plastic, metal, plywood, or any other suitable material. For example, it may be made in any one of acrylonitrile butadiene styrene (ABS), polycarbonate, unfilled nylon, polypropylene, PP copolymer, steel, copper, and so on. For another example, it may be made of a material that is suitable for site preservation of a flange.

In one embodiment, the cap device 200, 600 may be made in a heat-resistant material such as glass, steel, so that it may be used during the welding stage of the flange.

In another embodiment, at least one portion of the securing members 250, 350 (e.g. tip 290, 390) of cap device 200, 600 may be made in metal or a heat-resistant material, so that it may be used during the welding stage of the flange. During the welding process, temperatures may reach 200 degree F. The securing members 250, 350 in this case may have a shorter length, and the tips 290, 390 on the securing members 250 may absorb the heat without melting other parts of the cap device 200, 600 that may not be built with heat resistant material.

In one embodiment, the cover device 100 may be impact resistant.

In another embodiment, the cover device 100 may be made in a highly visible colour (e.g. red) to alert users to handle the cover device 100 and respectively engaged flange 400 carefully. The highly visible colour can also improve safety during fabrication and transportation. For example, the cover device 100 may be made in clear polypropylene such that a user can quickly inspect if a portion or all of the surface area of a flange is cleaned, greased, or painted properly. Cover device 100 may identify various flanges rating by color so as to improve identification of flange ratings during fabrication, transportation and assembly.

In one embodiment, the cover device 100 or the cap device 200, 600 may be designed to fit a variety of flange sizes or a variety of raised face heights for one particular flange size. For example, for a cover device 110 built for a flange size 4"-150#, the cap device 200 may be built to fit both flange sizes of 4"-150# and 4"-300#.

In another embodiment, the cover device 100 or the cap device 200, 600 may be designed to just fit one particular flange size only.

In one embodiment, the cap device 200, 600 may be made in a suitable material such that the face 210, 310 is semi- or fully transparent, in order to allow users to see through the face 210, 310 and inspect the flange underneath, when the cap device 200, 600 is inserted into a flange 400.

In another embodiment, the cap device 200, 600 may be made in a reusable or recyclable material.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be example only. The appended claims define distinctly and in explicit terms the subject matter of the invention for which an exclusive privilege or property is claimed.

What is claimed is:

1. An assembly for protecting an annular flange, the flange having an annular raised surface for receiving gaskets, the raised surface being annular and having an industry-standard diameter, comprising:
   a cap device for insertion into the flange, comprising:
      a cap cover for protecting the raised surface of the flange, wherein the cap cover has a shape corresponding to the shape of the raised surface of the flange and a diameter corresponding to the industry-standard diameter of the raised surface of the flange, the cap cover comprising a handle, wherein the cap cover is at least partially transparent for identifying features of the flange obstructed by the cap cover; and
      a retainer comprising at least two cap securing members releasably engageable with an inner surface of the flange in an interference fit, wherein the retainer is operable to releasably engage the cap cover in a friction-fit; and
   a cover device for covering both the cap and the flange, comprising:
      a cover face for protecting the front surface of the flange, the cover face comprising an outer periphery and a central cavity adapted to receive the cap cover in a friction fit, wherein the central cavity has a shape corresponding to the shape of the raised surface of the flange and a diameter corresponding to the industry-standard diameter of the raised surface of the flange; and
      an integrally-formed lip depending from the outer periphery of the cover face and perpendicular to the cover face, the lip comprising at least two cover securing members and releasably engagable with a peripheral edge of the flange.

2. The assembly of claim 1, wherein the cover device is configured to receive the cap cover in a snug fit.

3. The assembly of claim 1, wherein the cover face is at least partially transparent for identifying features of the flange obstructed by the cover face.

4. The cover device of claim 1, wherein the at least two cover securing members are integrally formed with the lip.

5. The cover device of claim 1, wherein one of the at least two cover securing members comprises a cantilever clip.

6. The cover device of claim 1, wherein one of the at least two cover securing members is adapted to engage the peripheral edge of the flange in a friction fit.

7. The cap cover of claim 1, wherein the cap cover further comprises a recess, and wherein the handle extends from a first side of the recess to a second side of the recess.

* * * * *